US007428592B2

(12) United States Patent
Lee et al.

(10) Patent No.: US 7,428,592 B2
(45) Date of Patent: Sep. 23, 2008

(54) SECURELY PERSISTING NETWORK RESOURCE IDENTIFIERS

(75) Inventors: Michele C. Lee, San Francisco, CA (US); Sajeed Ahmed, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 874 days.

(21) Appl. No.: 10/345,879

(22) Filed: Jan. 16, 2003

(65) Prior Publication Data

US 2004/0010607 A1      Jan. 15, 2004

Related U.S. Application Data

(60) Provisional application No. 60/395,152, filed on Jul. 11, 2002.

(51) Int. Cl.
  *G06F 15/16* (2006.01)
  *G06F 15/173* (2006.01)
  *G06F 15/177* (2006.01)

(52) U.S. Cl. ........................... 709/226; 709/229; 705/4; 715/742; 707/200; 711/158

(58) Field of Classification Search ......... 709/223–229, 709/217–222; 719/310–318; 705/4; 715/513, 715/742, 745, 712; 707/200, 104.1, 10, 101; 713/201; 725/20, 100–112; 711/158
See application file for complete search history.

(56) References Cited

U.S. PATENT DOCUMENTS

| | | |
|---|---|---|
| 5,010,478 A | 4/1991 | Deran |
| 5,077,666 A | 12/1991 | Brimm et al. |
| 5,455,953 A | 10/1995 | Russell |
| 5,530,861 A | 6/1996 | Diamant et al. |
| 5,581,691 A | 12/1996 | Hsu et al. |
| 5,664,154 A | 9/1997 | Purcell et al. |

(Continued)

OTHER PUBLICATIONS

Leon, McAfee's NetTools Promises to Ease Network Desktop Diagnosis, InfoWorld, San Mateo, Jul. 24, 1995, vol. 17, Iss. 30, p. 53.

(Continued)

*Primary Examiner*—Haresh N Patel
(74) *Attorney, Agent, or Firm*—Tonwsned and Townsend and Crew LLP

(57) ABSTRACT

Technology is disclosed for securely persisting a network resource identifier, such as a URL, that addresses a network resource, such as a portal. The network resource identifier is persisted from one network resource to another. A system accessed through the portal receives requests for accessing network resources associated with the system's applications and resources. In one example, the system provides the applications and resources via web pages. The system generates a link selector, based on information persisted in the requests. Selection of the link selector immediately brings a system user to the portal. Each request includes a parameter that corresponds to the network resource identifier for the portal. The system employs this parameter to obtain the information necessary to generate the link selector, such as an image and mouse-over text. The system includes a parameter in outgoing requests that calls for persisting the network resource identifier for the portal. The system also determines whether the network resource identifier is valid for persisting—preventing system users from being sent to a fraudulent copy of the portal.

75 Claims, 11 Drawing Sheets

U.S. PATENT DOCUMENTS

| | | |
|---|---|---|
| 5,678,041 A | 10/1997 | Baker et al. |
| 5,692,125 A | 11/1997 | Schloss et al. |
| 5,708,780 A | 1/1998 | Levergood et al. |
| 5,713,023 A | 1/1998 | Hayata et al. |
| 5,721,900 A | 2/1998 | Banning et al. |
| 5,724,595 A | 3/1998 | Gentner |
| 5,732,408 A | 3/1998 | Takahashi |
| 5,734,837 A | 3/1998 | Flores et al. |
| 5,764,890 A | 6/1998 | Glasser et al. |
| 5,815,703 A | 9/1998 | Copeland et al. |
| 5,848,273 A | 12/1998 | Fontana et al. |
| 5,944,824 A | 8/1999 | He |
| 5,991,810 A | 11/1999 | Shapiro et al. |
| 5,999,911 A | 12/1999 | Berg et al. |
| 6,014,666 A | 1/2000 | Helland et al. |
| 6,044,465 A | 3/2000 | Dutcher et al. |
| 6,073,109 A | 6/2000 | Flores et al. |
| 6,078,747 A | 6/2000 | Jewitt |
| 6,098,056 A | 8/2000 | Rusnak et al. |
| 6,131,120 A | 10/2000 | Reid |
| 6,134,634 A | 10/2000 | Marshall, Jr. et al. |
| 6,138,104 A | 10/2000 | Marchak et al. |
| 6,141,778 A | 10/2000 | Kane et al. |
| 6,145,003 A * | 11/2000 | Sanu et al. ................. 709/225 |
| 6,151,531 A | 11/2000 | Frankel et al. |
| 6,158,010 A | 12/2000 | Moriconi et al. |
| 6,182,142 B1 | 1/2001 | Win et al. |
| 6,195,710 B1 | 2/2001 | Borgendale et al. |
| 6,208,986 B1 | 3/2001 | Schneck et al. |
| 6,212,558 B1 | 4/2001 | Antur et al. |
| 6,253,202 B1 | 6/2001 | Gilmour |
| 6,253,239 B1 | 6/2001 | Shklar et al. |
| 6,253,257 B1 | 6/2001 | Dundon |
| 6,256,739 B1 | 7/2001 | Skopp et al. |
| 6,260,077 B1 | 7/2001 | Rangarajan et al. |
| 6,266,420 B1 | 7/2001 | Langford et al. |
| 6,278,993 B1 | 8/2001 | Kumar et al. |
| 6,279,043 B1 | 8/2001 | Hayward et al. |
| 6,314,470 B1 | 11/2001 | Ward et al. |
| 6,338,097 B1 | 1/2002 | Krenzke et al. |
| 6,343,287 B1 | 1/2002 | Kumar et al. |
| 6,347,312 B1 | 2/2002 | Byrne et al. |
| 6,349,306 B1 | 2/2002 | Malik et al. |
| 6,353,929 B1 * | 3/2002 | Houston ..................... 725/20 |
| 6,366,913 B1 | 4/2002 | Fitler, Jr. et al. |
| 6,401,101 B1 | 6/2002 | Britton et al. |
| 6,401,138 B1 | 6/2002 | Judge et al. |
| 6,415,368 B1 * | 7/2002 | Glance et al. ............... 711/158 |
| 6,434,531 B1 | 8/2002 | Lancelot et al. |
| 6,442,567 B1 | 8/2002 | Retallick et al. |
| 6,490,655 B1 | 12/2002 | Kershaw |
| 6,499,023 B1 | 12/2002 | Dong et al. |
| 6,523,022 B1 | 2/2003 | Hobbs |
| 6,529,941 B2 * | 3/2003 | Haley et al. ................. 709/204 |
| 6,539,379 B1 | 3/2003 | Vora et al. |
| 6,611,840 B1 | 8/2003 | Baer et al. |
| 6,671,695 B2 | 12/2003 | McFadden |
| 6,671,745 B1 | 12/2003 | Mathur et al. |
| 6,704,807 B1 | 3/2004 | Mathur et al. |
| 6,704,873 B1 | 3/2004 | Underwood |
| 6,708,170 B1 | 3/2004 | Byrne et al. |
| 6,721,804 B1 | 4/2004 | Rubin et al. |
| 6,732,178 B1 | 5/2004 | Van Horne et al. |
| 6,732,179 B1 | 5/2004 | Brown et al. |
| 6,741,853 B1 | 5/2004 | Jiang et al. |
| 6,757,720 B1 | 6/2004 | Wechsler, Jr. |
| 6,768,988 B2 | 7/2004 | Boreham et al. |
| 6,785,686 B2 | 8/2004 | Boreham et al. |
| 6,785,713 B1 | 8/2004 | Freeman et al. |
| 6,785,726 B1 | 8/2004 | Freeman et al. |
| 6,839,701 B1 | 1/2005 | Baer et al. |
| 6,880,086 B2 | 4/2005 | Kidder et al. |
| 6,948,135 B1 * | 9/2005 | Ruthfield et al. ............ 715/854 |
| 7,013,435 B2 * | 3/2006 | Gallo et al. ................. 715/850 |
| 7,013,469 B2 | 3/2006 | Smith et al. |
| 7,039,871 B2 | 5/2006 | Cronk |
| 7,069,330 B1 * | 6/2006 | McArdle et al. ............ 709/229 |
| 7,076,784 B1 | 7/2006 | Russell et al. |
| 7,114,037 B2 | 9/2006 | Agarwal et al. |
| 7,120,914 B1 * | 10/2006 | Manthos et al. ............ 718/108 |
| 7,266,595 B1 | 9/2007 | Black et al. |
| 2002/0032684 A1 | 3/2002 | Kobayashi et al. |
| 2002/0038306 A1 | 3/2002 | Griffin et al. |
| 2002/0049749 A1 | 4/2002 | Helgeson et al. |
| 2002/0067370 A1 * | 6/2002 | Forney et al. ............... 345/742 |
| 2002/0073180 A1 * | 6/2002 | Dewhurst et al. .......... 709/220 |
| 2002/0083178 A1 * | 6/2002 | Brothers ..................... 709/226 |
| 2002/0138763 A1 * | 9/2002 | Delany et al. ............... 713/201 |
| 2002/0161766 A1 | 10/2002 | Lawson et al. |
| 2003/0028752 A1 | 2/2003 | Fu et al. |
| 2003/0037052 A1 | 2/2003 | Kitain et al. |
| 2003/0055762 A1 | 3/2003 | Holt |
| 2003/0055806 A1 | 3/2003 | Wong et al. |
| 2003/0083908 A1 * | 5/2003 | Steinmann ..................... 705/4 |
| 2003/0088708 A1 | 5/2003 | Lewallen |
| 2003/0097380 A1 | 5/2003 | Mulhern et al. |
| 2003/0105733 A1 | 6/2003 | Boreham et al. |
| 2003/0105742 A1 | 6/2003 | Boreham et al. |
| 2003/0115196 A1 | 6/2003 | Boreham et al. |
| 2003/0115548 A1 | 6/2003 | Melgar |
| 2003/0120593 A1 | 6/2003 | Bansal et al. |
| 2003/0120601 A1 | 6/2003 | Ouye et al. |
| 2003/0144982 A1 | 7/2003 | Reulein et al. |
| 2003/0145074 A1 | 7/2003 | Penick |
| 2003/0204481 A1 | 10/2003 | Lau |
| 2003/0208397 A1 | 11/2003 | VanDusen |
| 2003/0217127 A1 | 11/2003 | Sinn |
| 2003/0217333 A1 * | 11/2003 | Smith et al. ................. 715/513 |
| 2004/0003351 A1 * | 1/2004 | Sommerer et al. .......... 715/517 |
| 2004/0010514 A1 * | 1/2004 | Agarwal et al. .......... 707/104.1 |
| 2004/0010520 A1 * | 1/2004 | Tsang et al. ................. 707/200 |
| 2004/0024762 A1 | 2/2004 | Agarwal et al. |
| 2005/0240490 A1 * | 10/2005 | Mackey ....................... 705/26 |

OTHER PUBLICATIONS

Cooney, IBM rolls out host- and server-based mgmt. apps, Network World, Framingham, Feb. 6, 1995, vol. 12, Iss. 6, pp. 6-7.
Walsh, Remedy releases three applications for help-desk suite, InfoWorld, San Mateo, Apr. 21, 1997, vol. 19, Iss. 16, p. 34.
Schmersal, Testing to maintain service standards, Communications News, Nokomis, Mar. 1998, vol. 35, Iss. 3, pp. 22-23.
Musthaler, The trouble with help desk selection, Network World, Framingham, Feb. 20, 1995, vol. 12, Iss. 8, pp. 35-39.
Clear Trust, Unified Access Management, Securant Technologies, Inc., pp. 1-23, 1997.
U.S. Appl. No. 10/314,888, Office Action dated Jan. 26, 2006, 31 pages.
U.S. Appl. No. 10/327,607, Office Action dated Feb. 13, 2006, 5 pages.
U.S. Appl. No. 10/345,873, Office Action dated Sep. 9, 2005, 13 pages.
U.S. Appl. No. 10/345,873, Office Action dated Mar. 10, 2006, 7 pages.
U.S. Appl. No. 10/354,913, Office Action dated Sep. 9, 2003, 19 pages.
U.S. Appl. No. 10/354,913, Final Office Action dated Apr. 6, 2004, 22 pages.
U.S. Appl. No. 10/354,913, Office Action dated Apr. 15, 2005, 20 pages.
U.S. Appl. No. 10/354,913, Final Office Action dated Dec. 5, 2005, 15 pages.
U.S. Appl. No. 10/354,914, Office Action dated Aug. 1, 2005, 15 pages.

U.S. Appl. No. 10/354,914, Final Office Action dated Feb. 10, 2006, 16 pages.

Kim, K.H., "APis for Real-Time Distributed Object Programming", Computer, IEEE 2000, June, pp. 72-80.

McLellan, et al., "Building More Usable ApIs", IEEE Software, pp. 78-86, May/Jun. 1998.

Saba—Products, Saba Enterprise 5, dated 1997-2006, 2 pages.

Saba—Company, dated 1997-2006, 1 page.

Saba—Solutions, Competency-Driven HCM, dated 1997-2006, 1 page.

Saba—Talent, dated 1997-2006, 2 pages.

Saba—Collaboration, dated 1997-2006, 1 page.

Stets, et al., "Component-Based APIs for Versioning and Distributed Applications", IEEE, pp. 54-61, 1999.

U.S. Appl. No. 10/314,888, Office Action dated Jul. 26, 2006, 26 pages.

U.S. Appl. No. 10/325,465, Office Action dated Sep. 19, 2006, 25 pages.

U.S. Appl. No. 10/327,607, Office Action dated Apr. 18, 2006, 33 pages.

U.S. Appl. No. 10/328,920, Office Action dated May 31, 2006, 20 pages.

U.S. Appl. No. 10/354,913, Office Action dated May 12, 2006, 16 pages.

U.S. Appl. No. 10/325,465, Final Office Action dated Apr. 4, 2007, 25 pages.

U.S. Appl. No. 10/325,465, Advisory Action dated Jun. 19, 2007, 3 pages.

U.S. Appl. No. 10/327,607, Office Action dated Apr. 30, 2007, 31 pages.

U.S. Appl. No. 10/354,914, Final Office Action dated Apr. 5, 2007, 9 pages.

U.S. Appl. No. 10/952,592, Final Office Action dated May 3, 2007, 54 pages.

\* cited by examiner

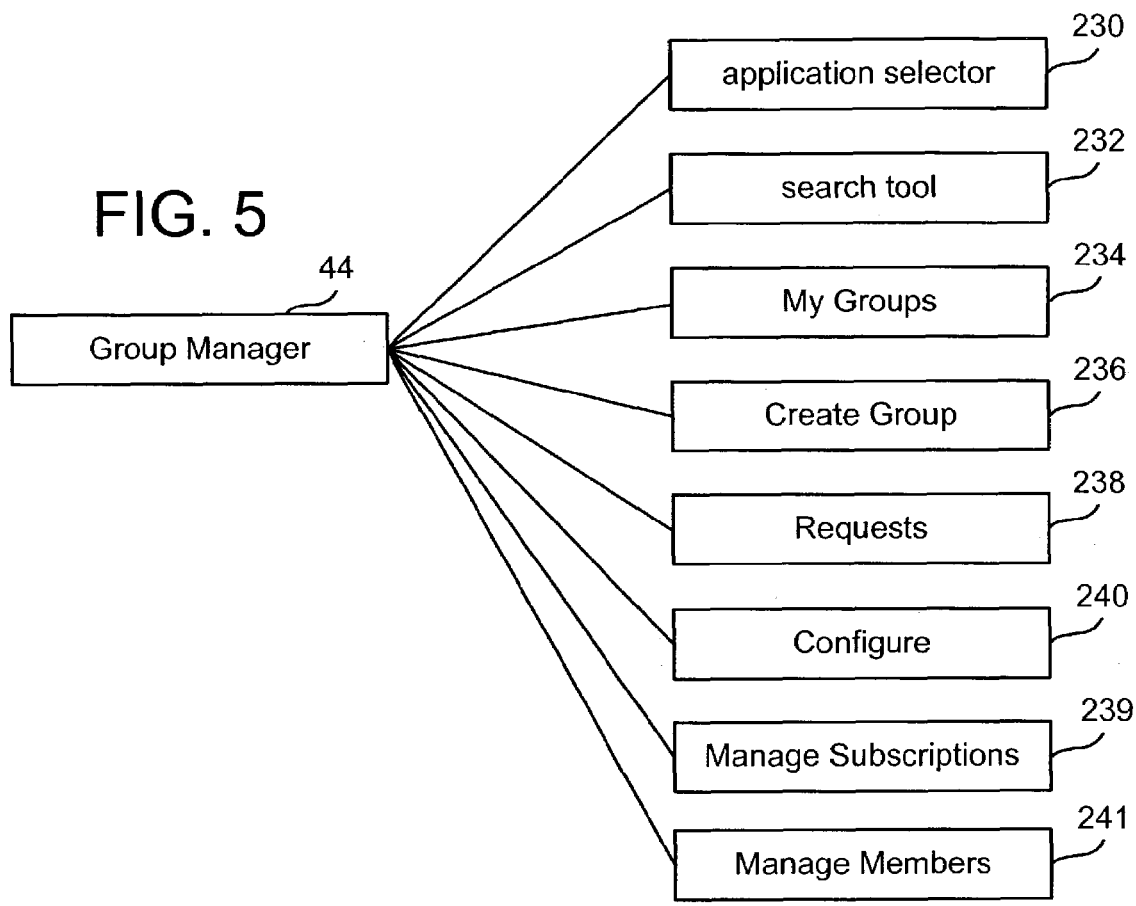
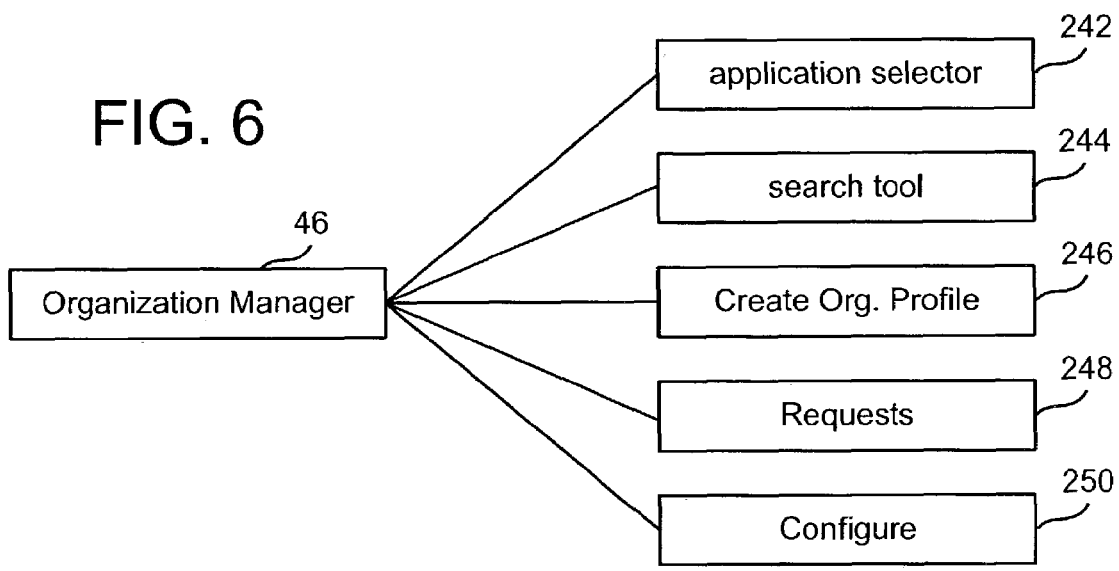

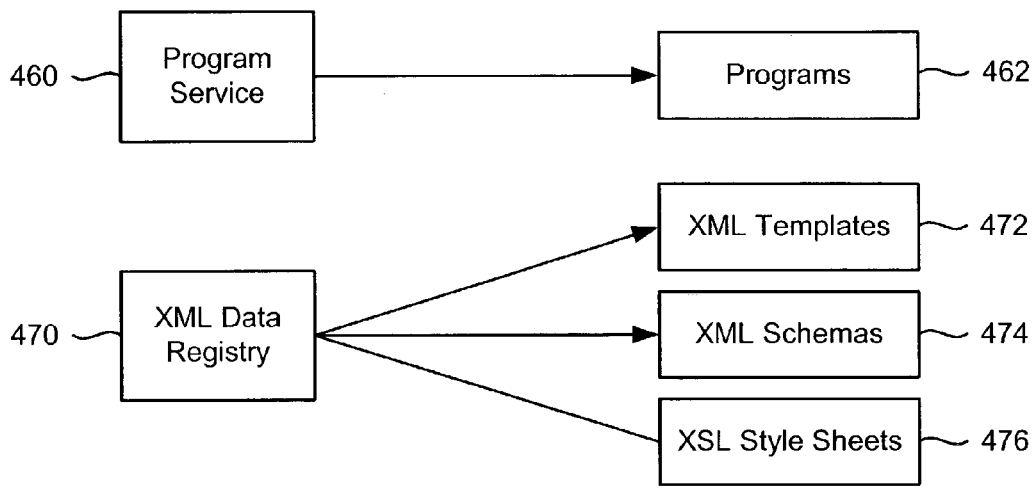
FIG. 11
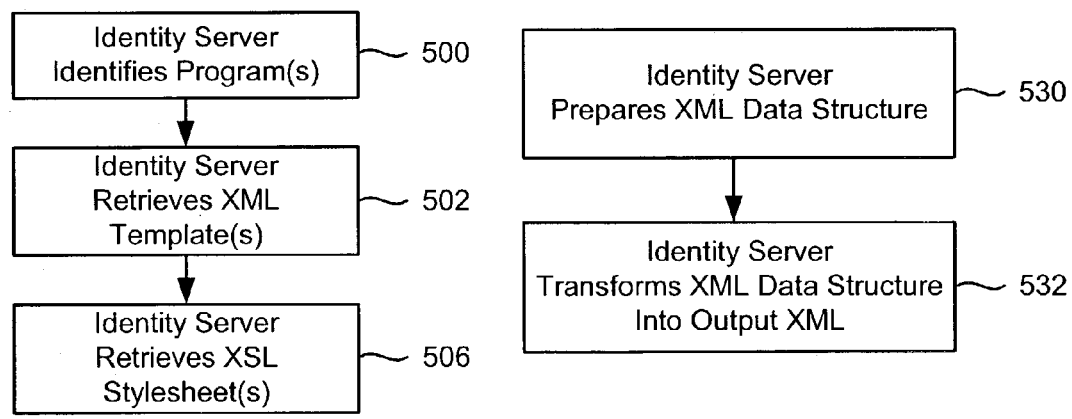
FIG. 12
FIG. 13

SECURELY PERSISTING NETWORK RESOURCE IDENTIFIERS

This application claims the benefit of U.S. Provisional Application No. 60/395,152, "Access and Identity System," filed on Jul. 11, 2002, which is incorporated herein by reference.

CROSS-REFERENCE TO RELATED APPLICATIONS

This Application is related to "Preparing Output XML Based on Selected Programs and XML Templates," by Michele C. Lee, U.S. patent application Ser. No. 09/997,410 now U.S. Pat. No. 6,782,379, filed Nov. 30, 2001, and incorporated herein by reference in its entirety.

BACKGROUND OF THE INVENTION

1. Field of the Invention

The present invention is directed to technology for persisting network resource identifiers.

2. Description of the Related Art

With the growth of the Internet, the use of networks, and other information technologies, Identity Systems have become more popular. In general, an Identity System provides for the creation, removal, editing and other managing of identity information stored in various types of data stores. The identity information pertains to users, groups, organizations and/or things. For each entry in the data store, a set of attributes are stored. For example, the attributes stored for a user may include a name, address, employee number, telephone number, email address, user ID and password. The Identity System can also manage access privileges that govern what an entity can view, create, modify or use in the Identity System. Often, this management of access privileges is based on one or more specific attributes, membership in a group and/or association with an organization.

In some instances, an organization provides its member with access to an Identity System through a portal. For example, the organization's web page may include a link selector, such as a button, icon, or address entry field that a member can use to address and access Identity System applications and resources. In using the Identity System, a member may access many applications and resources.

When the member's use of the Identity System is complete, the user will most likely want to return to the organization's portal. Traditional technology requires the member to enter a network address for the portal into a browser application. Alternatively, the member may be able to employ a "Back" function in the Identity System—allowing the user to move from the current location in the Identity System to the location the member was at immediately preceding the current location. The member will repeatedly invoke the Back function until the portal is reached.

Entering the address and repeatedly invoking the Back function are cumbersome and inconvenient. It is desirable for the member to have the ability to jump directly from the current location to the portal.

Some Identity System users also employ an Access Systems. An Access System provides for the authentication and authorization of users attempting to access resources. For efficiency purposes, there is an advantage to integrating the Identity System and the Access System. Additionally, integrating the Identity System and the Access System allows for single-sign-on functionality across multiple resources. Thus, there is also a need for Access Systems and integrated Identity/Access Systems to provide for the immediate access of a portal from any network location reached through the portal. Systems other than Identity and Access Systems can also benefit from providing immediate return to a portal. Examples of such systems include, but are not limited to, systems for ordering materials or inventory and systems providing personnel management.

SUMMARY OF THE INVENTION

The present invention, roughly described, pertains to technology for securely persisting a network resource identifier, such as a Uniform Resource Locator ("URL"). In one implementation, the network resource identifier addresses a network resource, such as a portal. The network resource identifier is persisted from one network resource to another. Each network resource provides a link selector, such as a button, that corresponds to the persisted network resource identifier. The link selector allows an entity accessing the network resource to immediately return to the portal addressed by the persisted network resource identifier.

Embodiments of the present invention have broad applicability to many different types of network resources. In one implementation, a portal provides access to an Identity System with applications and resources. The Identity System receives requests for access to the applications and resources and provides access to them in the form of network addressable pages, such as web pages. Each of the network addressable pages is a network resource that includes a link selector providing immediate access back to the portal.

The Identity System generates the link selector, based on information persisted in the requests. Each request includes a parameter that corresponds to the network resource identifier for the portal. The Identity System employs this parameter to obtain the information necessary for generating the link selector. In one implementation, this information includes an image and mouse-over text. In addition to creating the link selector, the Identity System includes a parameter in outgoing requests that calls for persisting the network resource identifier for the portal.

In further embodiments, the Identity System also determines whether the network resource identifier is valid for persisting. This prevents Identity System users from being directed to a fraudulent copy of the portal. In one implementation, the Identity System attempts to locate an entry in a registration list that corresponds to the parameter in the request. If the Identity System locates a corresponding entry in the registration list, the network resource identifier is persisted—the Identity System creates a link selector and persists the network resource identifier in outgoing requests. Otherwise, the network resource identifier is not persisted. Alternatively, the Identity System can apply a filter to determine whether the network resource identifier identified in the request is valid for persisting.

Various embodiments of the present invention are incorporated in an Identity, Access, or integrated Identity/Access System. Further embodiments, however, are employed in systems other than Identity, Access, and integrated Identity/Access Systems.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 5 is a block diagram depicting the Group Manager.

FIG. 6 is a block diagram depicting the Organization Manager.

FIG. 11 is a block diagram illustrating an identity server's program service and XML data registry.

FIG. 12 is a flowchart describing a process for translating a request.

FIG. 13 is a flowchart describing a process for preparing Output XML.

DETAILED DESCRIPTION

Figure 1:
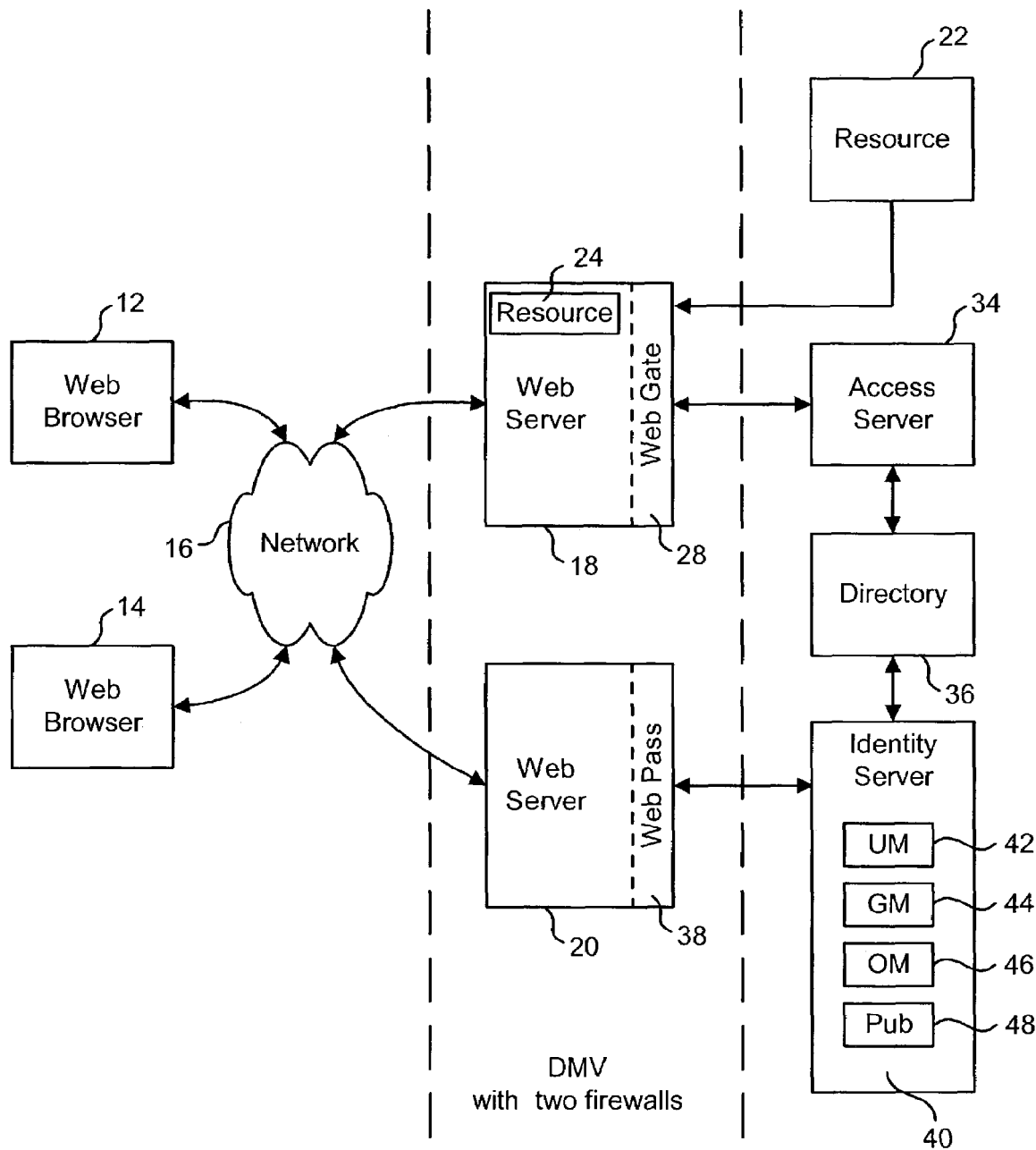
FIG. 1 is a block diagram depicting the components of one embodiment of the present invention.

FIG. 1 depicts an example of an access management system that provides identity management services and/or access management services for a network. The identity management portion of the system (referred to as "the Identity System") manages identity profiles, while the access management portion of the system (referred to as "the Access System") provides security for resources across one or more Web Servers (or other components). A key feature of one embodiment of this system is the centralization of the repositories for policies and identity profiles, while decentralizing their administration. That is, one embodiment of the system centralizes the policy and identity repositories by building them on a directory service technology. The system decentralizes their administration by hierarchy delegating administrative roles. Although the system of FIG. 1 includes an Identity System and an Access System, other embodiments may only include an Identity System or only include an Access System.

FIG. 1 is a block diagram depicting one embodiment for deploying an integrated Identity System and Access System.

FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see RFC 1738). A resource can include a web page, software application, file, database, directory, data unit, etc. In one embodiment, a resource is anything accessible to a user via a network. The network could be the Internet, a LAN, a WAN, or any other type of network.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory 36.

The Access System includes Access Server 34, Web Gate 28, and Directory 36. Access Server 34 provides authentication, authorization, auditing and logging services. It further provides for identity profiles to be used across multiple domains and for access based on a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory 36. Identity Server 40 manages identity profiles. An identity profile is a set of information associated with a particular entity (e.g. user, group, organization, etc.). The data elements of the identity profile are called attributes. An attribute may include a name, a value and access criteria. The Identity Server includes three main applications, which effectively handle the identity profiles and privileges of the user population: User Manager 42, Group Manager 44, and Organization Manager 46. User Manager 42 manages the identity profiles for individual users. Group Manager 44 manages identity profiles for groups. Organization Manager 46 manages identity profiles for organizations. Identity Server 40 also includes Publisher 48, an application that enables entities to quickly locate and graphically view information stored by Directory 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Group Manager 44 allows entities to create, delete and manage groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets organizations form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations within an e-business network, including partners, suppliers, or even major internal organizations such as sales offices and business units. Certain infrastructure security and management operations are best handled—or can only be handled—at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The various components of FIG. 1 can be implemented by software running on computing devices. Many different types of computing devices can be used, including servers, mainframes, minicomputers, personal computers, mobile computing devices, etc. Typically, such computing devices will have one or more processors that are programmed by code that is stored in one or more processor readable storage devices. The one or more processors are in communication with the processor readable storage devices, peripherals (e.g. keyboards, monitors, pointing devices, printers, etc.) and communication interfaces (e.g. network interfaces, modems, wireless transmitters/receivers, etc.).

The system of FIG. 1 is scalable. There can be many Web Servers, many Access Servers, and many Identity Servers. In one embodiment, Directory 36 is a Directory Server and communicates with other servers/modules using LDAP or LDAP over SSL. In other embodiments, Directory 36 can implement other protocols or can be other types of data repositories (e.g. relational database using SQL, etc.). Many variations of the system of FIG. 1 can be used with the present invention. For example, instead of accessing the system with a web browser, an API can be used. Alternatively, portions of functionality of the system at FIG. 1 can be separated into independent programs that can be accessed with a URL.

To understand how the system of FIG. 1 protects a resource, first consider the operation of unprotected resources. With a typical unprotected resource, end users cause their browsers to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information.

The received log-on information is passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory 36. If the user's supplied log-on information satisfies the authentication criteria, the process flows as described below; otherwise, the end user is notified that access to the requested resource is denied and the process halts.

After authenticating the user, Web Gate 28 queries Access Server 34 about whether the user is authorized to access the resource requested. Access Server 34 in turn queries Directory 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

Figure 2:
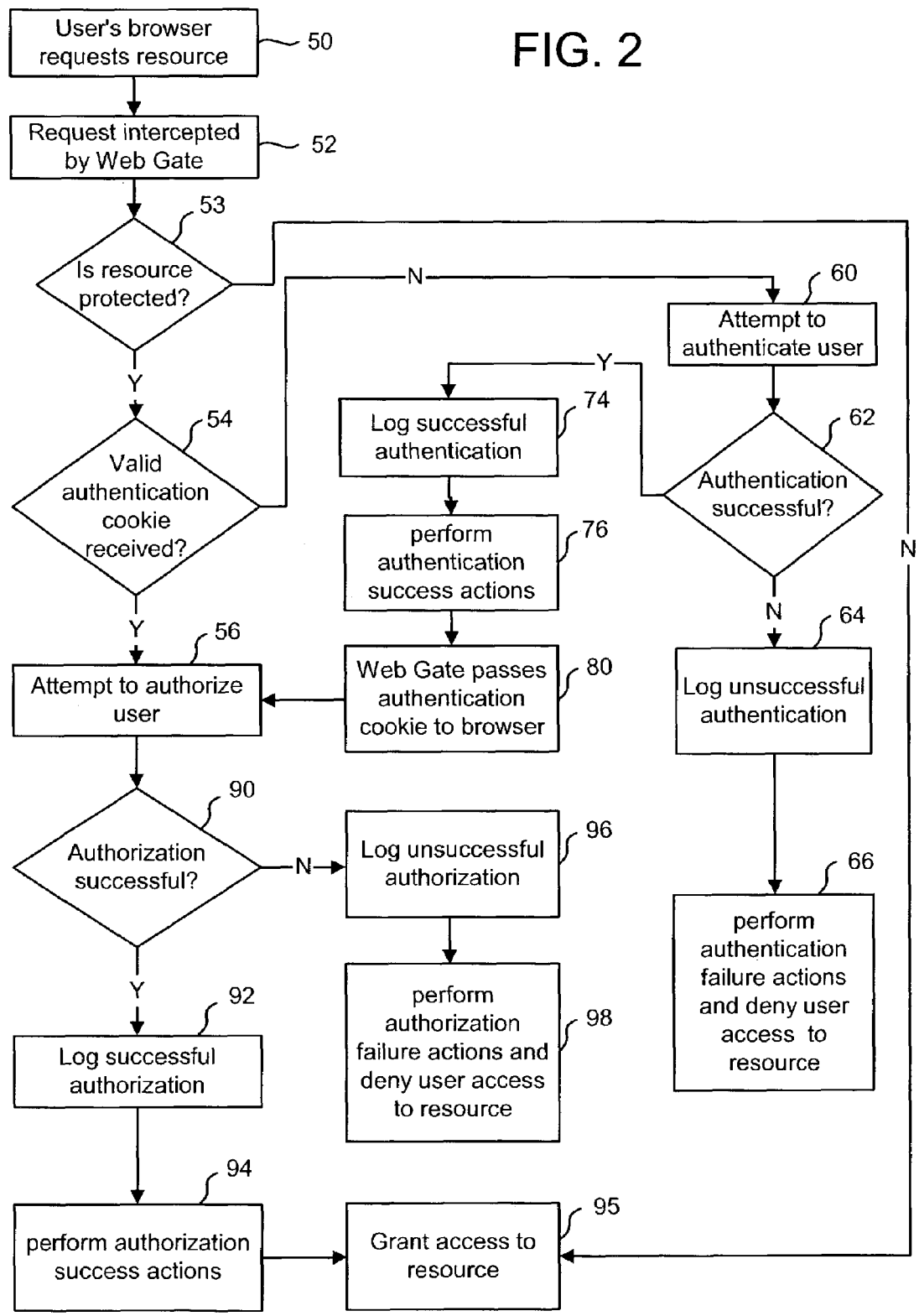
FIG. 2 is a flow chart describing one embodiment of a process for authenticating and authorizing.

FIG. 2 provides a flow chart for one embodiment of a method for authenticating and authorizing. A user's browser 12 requests a web-enabled resource 22 or 24 (step 50). The request is intercepted by Web Gate 28 (step 52). The method then determines whether the requested resource is protected by an authentication and/or authorization rule (step 53). If the resource is not protected, then access is granted to the requested resource (step 95). If the requested resource is protected, however, the method proceeds to step 54. If the user was previously authenticated for a protected resource in the same domain, a valid authentication cookie is passed by browser 12 with the request in step 50. The authentication cookie is intercepted by Web Gate 28 in step 52. If a valid cookie is received (step 54), the method attempts to authorize the user (step 56). If no valid authentication cookie is received (step 54), the method attempts to authenticate the user for the requested resource (step 60).

If the user successfully authenticates for the requested resource (step 62), then the method proceeds to step 74. Otherwise, the unsuccessful authentication is logged (step 64). After step 64, the system performs authentication failure actions and Web Gate 28 denies the user access to the requested resource (step 66). In step 74, the successful authentication of the user for the resource is logged. The method then performs authentication success actions (step 76). In response to the successful authentication, Web Gate 28 then passes a valid authentication cookie to browser 12 (step 80), which stores the cookie. After passing the cookie in step 80, the system attempts to authorize (step 56).

In step 56, the method determines whether the user is authorized to access the requested resource. If the user is authorized (step 90), the method proceeds to step 92. Otherwise, the unsuccessful authorization is logged (step 96). After step 96, the method performs authorization failure actions (step 98) and Web Gate 28 denies the user access to the requested resource. If authorization is successful (step 90), then the successful authorization of the user is logged (step 92). Authorization success actions are performed in step 94. The user is granted access to the requested resource (step 95). In one embodiment of step 95, some or all of HTTP request information is provided to the resource. In one or more scenarios, the resource being accessed is the Identity System.

More information about authorization, authentication, an Access System and an Identity System can be found in U.S. patent application Ser. No. 09/999,074, "Workflows With Associated Processes," filed on Nov. 30, 2001, which is incorporated herein by reference in its entirety.

Both the Identity System and the Access System make use of Directory 36. The basic unit of information store in Directory 36 is called an entry or identity profile, which is a collection of information about an object. The information in an entry often describes a real-world object such as a person, but this is not required. A typical directory includes many entries that correspond to people, departments, groups and other objects in the organization served by the directory. An entry is composed of a set of attributes, each of which describes one particular trait of the object. Each attribute has a type, one or more values, and associated access criteria. The type describes the kind of information contained in the attribute, and the value contains the actual data.

An entry in the directory has a set of attributes that are required and a set of attributes that are allowed. For example, an entry describing a person is required to have a cn (common name) attribute and an sn (surname) attribute. One example of an allowed attribute may be a nickname. Any attribute not explicitly required or allowed is prohibited.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

Figure 3:
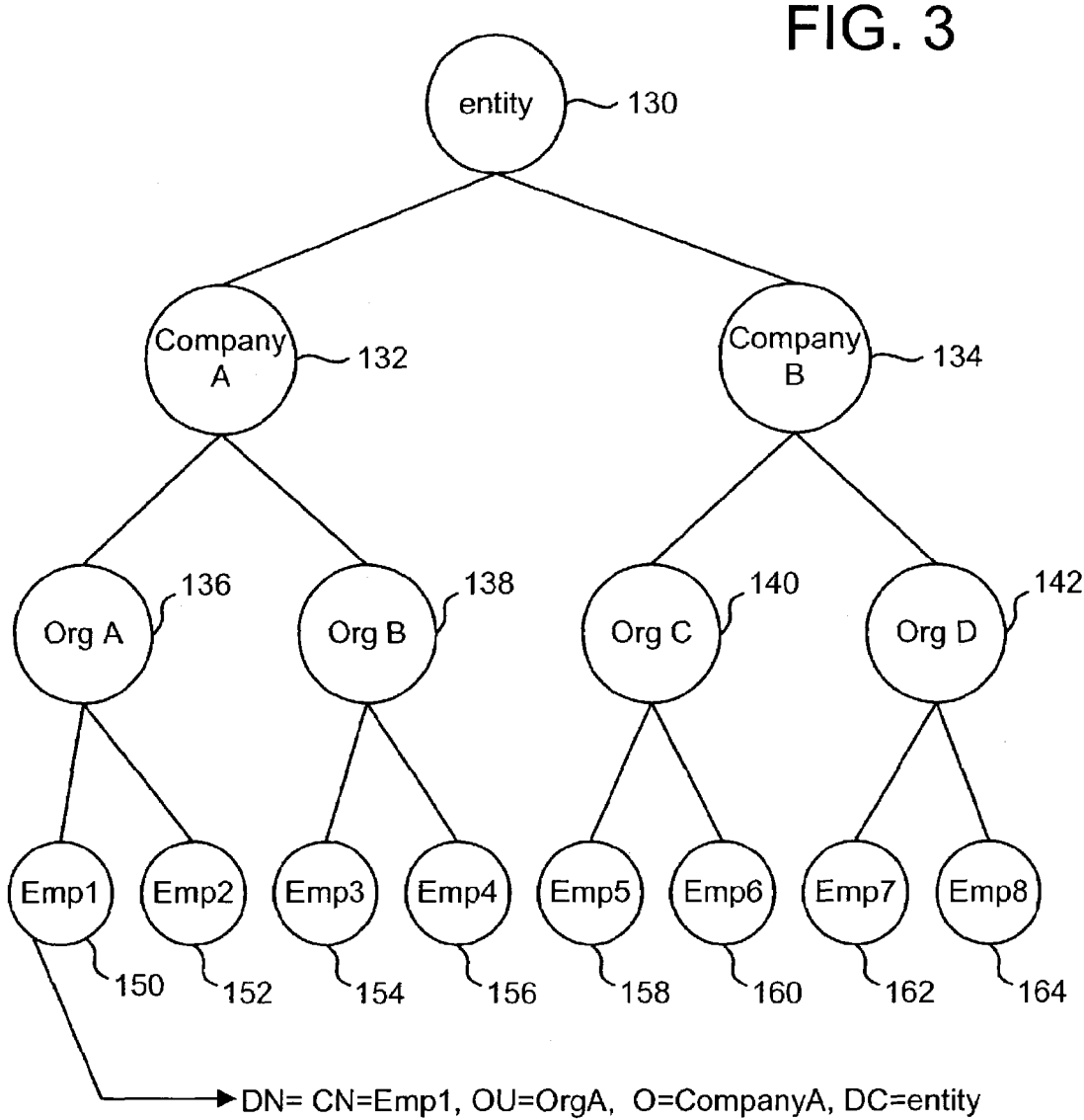
FIG. 3 is an example of a directory tree structure.

FIG. 3 depicts an exemplar directory tree that can be stored in Directory 36. Each node on the tree is an entry in the directory structure that includes an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 130. Each of the companies with Extranet access would have a node at a level below node 130. For example, company A (node 132) and company B (node 134) are directly below node 130. Each company may be broken up into organizations. The organizations could be departments in the company or logical groups to help manage the users. For example, FIG. 3 shows company A broken up into two organizations: organization A with node 136 and organization B with node 138. Company B is shown to be broken up into two organizations: organization C with node 140 and organization D with node 142. FIG. 3 shows organization A having two end users: employee 1 with node 150 and employee 2 with node 152. Organization B is shown with two end users: employee 3 with node 154 and employee 4 with node 156. Organization C is shown with two end users: employee 5 with node 158 and employee 6 with node 160. Organization D is shown with two end users: employee 7 with node 162 and employee 8 with node 164.

Each entity has a distinguished name (DN), which uniquely identifies the node. In one embodiment, each entry also has a relative name, which is different from all other relative names on the same level of the hierarchy. In one implementation, the distinguished name (DN) comprises a union of the relative names up the tree. For example, the distinguished name of employee 1 (node 150) is DN=CN=Empl, OU=OrgA, O=CompanyA, DC=entity, where:

| | |
|---|---|
| DC = | Domain Component |
| O = | Organization |
| OU = | Organizational Unit |
| CN = | common name. |

FIG. 3 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity System's services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

As described above, the Identity System of FIG. 1 includes User Manager 42, Group Manager 44 and Organization Manager 46. User Manager 42 manages identity profiles for users. Group Manager 44 manages identity profiles for groups. Organization Manager 46 manages identity profiles for organizations. Each of these components will now be described in more detail.

Figure 4:
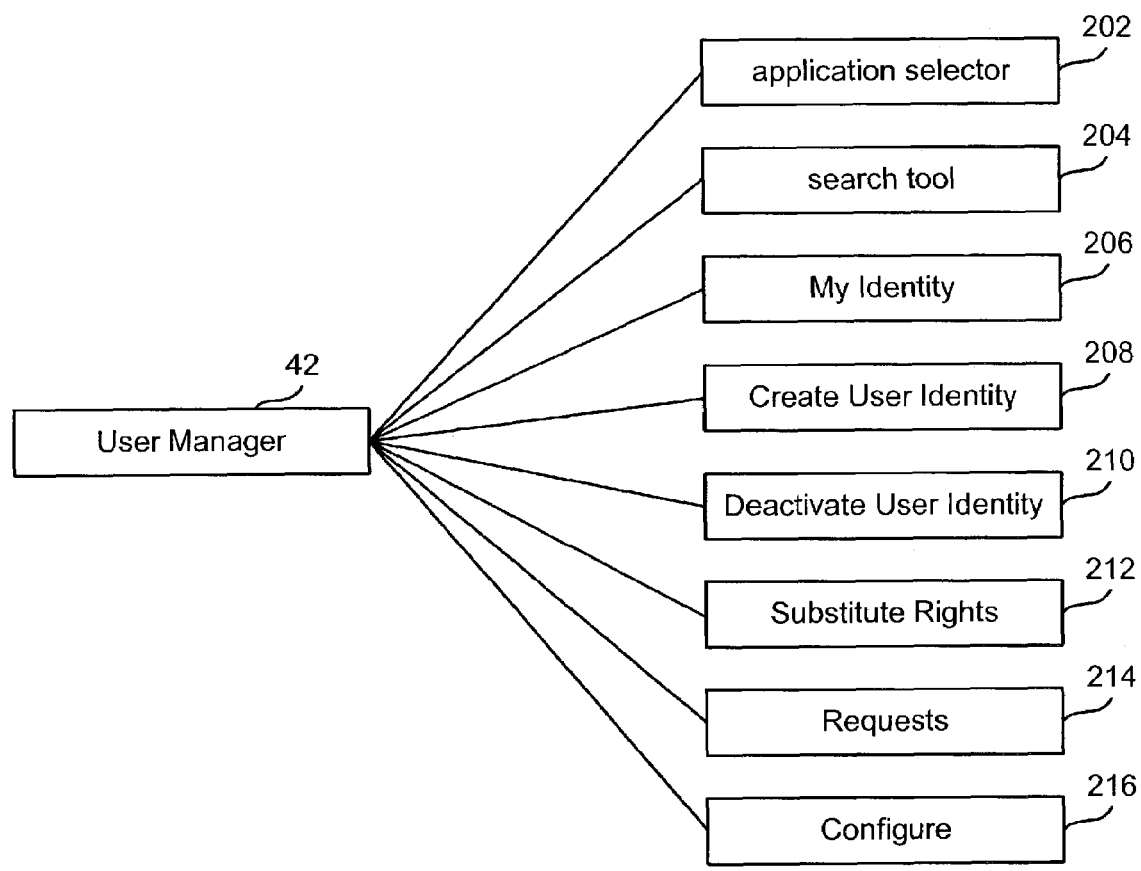
FIG. 4 is a block diagram depicting the User Manager.

FIG. 4 graphically depicts the various services provided by User Manager 42. Each of these services can be accessed from a User Manager home page. For example, in one embodiment, the home page will include application selector 202, search tool 204, My Identity tab 206, Create User Identity tab 208, Deactivate User Identity tab 210, Substitute Rights tab 212, Requests tab 214 and Configure tab 216. Application selector 202 lets the user change applications from the User Manager to either the Group Manager, Object Manager or Publisher. In one embodiment, application selector 202 is a drop down menu. Search tool 204 enables a user to provide search information in order to search the directory for a set of one or more user identity profiles.

By selecting My Identity tab 206, a user is provided with the information stored in that user's identity profile. Create User Identity tab 208 allows a user with the appropriate privileges to create a new user identity profile (e.g. with a workflow). Deactivate User Identity tab 210 allows a user with proper privileges to remove an identity profile from the directory. Substitute Rights tab 212 allows the user to indicate who can proxy that user and allows the user to be a proxy for someone else. Request tab 214 allows a user to monitor workflows that are in progress or recently completed. Depending on the user's privileges, by selecting request tab 214, the user can see all workflows that involve that user, that are started by that user, that affect that user or that the user has privileges to view. Request tab 214 will indicate workflows for which there is an outstanding action to be done by the current user. The user can select that workflow and perform the task.

Configure tab 216 allows a user to configure various options for User Manger 42. The user must have sufficient privileges to access Configure tab 216. The user can perform attribute access control, delegate administration, define workflows and set the search base. Attribute access control includes controlling who has view and modify permissions for each attribute. Attributes can be set at any and all levels in an organization. The configuration also allows the specification of an e-mail notification list when a change to an attribute is requested. Delegation administration includes delegating administrative tasks to local administrators. An entity can choose what rights to delegate, whom to delegate to, and the scope to delegate. Workflow definition includes defining workflows for a particular organization, defining who will be responsible for the workflow actions and/or defining who will be receiving notifications for the workflow actions. Setting the search base includes setting the search base for a particular organization, person or set of persons. This will localize access to ensure security.

FIG. 5 depicts the various services provided by Group Manager 44. Once an entity is at the Group Manager home page, the entity can access application selector 230, search tool 232, My Groups tab 234, Create Groups tab 236, Request tab 238, Manage Subscriptions tab 239, Configure tab 240, and Manage Members tab 241. My Groups tab 234 indicates the groups of which the entity is a member. By selecting any of the groups identified by My Groups tab 234 or Search Tool 232, the user will be provided with the identity profile page for that particular group. From the profile page, the group can be modified or deleted. Create groups tab 236 allows the user to create a new group. Request tab 238 provides the user with access to currently pending and recently finished workflows that involve groups. Configure tab 240 allows the user to configure various information about groups in the Group Manager. While viewing the identity profile for a group, the entity can modify that profile if the entity has appropriate privileges.

Configure tab 240 allows an entity to provide attribute access control, delegate rights, define workflows and expand dynamic groups. Attribute access control includes controlling who has view and modify permissions for each attribute in group identity profiles. Additionally, e-mail notification lists can be created which are used to notify entities when a change to an attribute is requested. Administration tasks can be delegated to local administrators. An entity can choose what rights to delegate, who to delegate to, and what the scope of the delegation is. Workflow definition includes defining the workflows for a particular group. This includes defining who is responsible for the workflow actions and who will be receiving notifications for workflow actions. Note that some of the tabs and services may not be available to all entities, depending upon the privileges of those entities. Manage Subscriptions tab 239 allows users to subscribe to groups or unsubscribe from groups. Manage Members tab 241 allows users to view, add, remove, and search members of a group.

FIG. 6 depicts the services provided by Organization Manager 46. Organization manager 46 provides functionality to create, modify, delete and manage organizational objects. From the home page for Organization Manager 46, a user is provided with application selector 242, search tool 244, Create Organizational Profile tab 246, Request tab 248 and Configure tab 250. Application selector 242 allows the user to select a different application to access. Search tool 244 provides a user with the ability to enter search terms in order to search for one or more organizational objects. After performing a search, the user will be provided with a list of organizational objects meeting the search requirements. User can select any of these objects to view, modify or delete, if the user has sufficient privileges.

Create Organizational Profile tab 246 allows a user to create new organizational objects, if the user has sufficient privileges. Request tab 248 allows a user to access pending workflows and workflows that have recently been finished that relate to organizational objects. Access to Request tab 248 can be restricted and/or limited depending upon users privileges. If a user has a step to perform for a workflow, it will be indicated by Request tab 248.

Configure tab 250 allows the entity to perform attribute access control, delegate administration, define workflows and define container limits. Attribute access control includes controlling who has view and modify permissions for each attribute of an organizational identity profile. In addition, an entity can specify an e-mail notification list when a change to an attribute is requested. Delegating administration includes delegating administrative tasks to local administrators. An entity can choose what rights to delegate, whom to delegate to, and the scope of the delegation. Workflow definition includes defining the workflows for a particular organization, including who will be responsible for the workflow actions and who will be receiving notifications for the workflow. Container limits includes controlling how many objects can be created in an organization. This would also include defining who will be receiving notifications that a container limit has been met, has been violated or is close to being met.

In some instances, users access the integrated Identity/Access System through a portal. For example, an organization employing the integrated Identity/Access System may have a primary website that employees use to access resources available on a network. Example networks include the Internet, an intranet, an extranet, a local area network, and a wide area network. The organization's website serves as a portal into applications and resources on the Identity/Access System. This is also true for individual Identity Systems and Access Systems.

A user navigates through the applications in the Identity/Access System by continually submitting requests that transition the user from one addressable network resource to another. In one example, the portal website issues a URL for the user that causes a web page for User Manager 42 to be returned. The user may issue another URL from User Manager 42 that addresses a different application, such as Group Manager 44. This process continues with the user traversing several web pages into the Identity/Access System. In order to return to the initial portal, the user must issue a URL for the portal. Alternatively, the user can repeatedly employ a "Back" function found on standard browsers and web pages—allowing the user to return to a network resource that issued the URL to obtain access to the current network resource. The user performs this action at each network resource until the user reaches the portal.

Embodiments of the present invention securely persist a network address for the portal as the user traverses from one network resource to another. This allows the user to quickly return to the portal. In one embodiment, each network resource provides an interface button the user can select to immediately return to the portal. In alternate embodiments, an address for a network resource other than the portal is persisted. In this implementation, a user can immediately jump to a designated network resource other than the portal. Although URLs are discussed above, network resource identifiers can employ any type of addressing scheme in embodiments of the present invention. Furthermore, network resources extend beyond web pages to include anything on a network that can be addressed.

Figure 7:
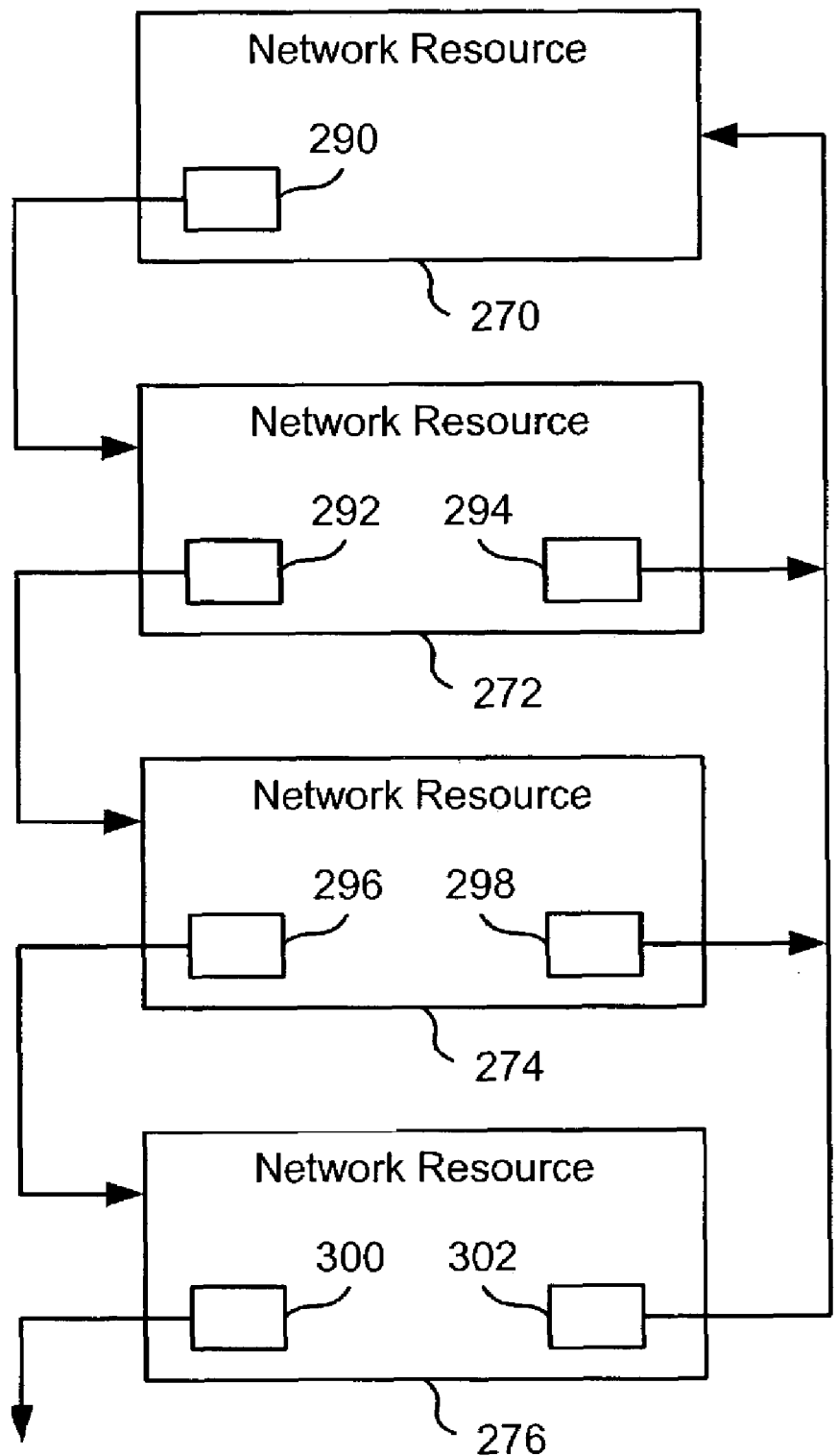
FIG. 7 is a block diagram depicting one embodiment of traversing network resources while persisting a network resource identifier.

FIG. 7 is a block diagram depicting the traversal of multiple network resources, while a network resource identifier for returning to an initial network resource is securely persisted. Network Resource 270 serves as the first network resource accessed by the user in a chain of network resources. In one embodiment, Network Resource 270 is a portal. Network Resource 270 includes link selector 290, which allows the user to travel from Network Resource 270 to Network Resource 272. In one embodiment, link selector 290 is a radio button implemented in Network Resource 270 with an underlying URL to Network Resource 272. Network Resource 270 issues the URL when the user selects link selector 290. In an alternate embodiment, link selector 290 accepts a user—entered URL for addressing and accessing Network Resource 272. In one embodiment, the URL is a Hypertext Transport Protocol ("HTTP") request. In alternate embodiments, different protocols are employed for addressing network resources.

Network Resource 272 contains link selector 292 and link selector 294. Link selector 292 operates the same as link selector 290 in Network Resource 270—sending an address that accesses Network Resource 274. Link selector 294 causes an address for Network Resource 270 to be issued when selected by the user. Network Resource 274 contains link selector 296 and link selector 298 that operate the same as the above-described link selectors 292 and 294, respectively. Link selector 296 allows the user to address Network Resource 276. Link selector 298 provides the user with the ability to issue an address that immediately brings the user for Network Resource 270. Network Resource 276 includes link selector 300 and link selector 302 that operate the same as link selectors 296 and 298, respectively. Link selector 302 allows the user immediately transition back to initial Network Resource 270. In one implementation, Network Resource 270 is a portal; Network Resource 272 is a web page for User Manager 42; Network Resource 274 is a web page for Group Manager 44; Network Resource 276 is a web page for Organization Manager 46.

As shown in FIG. 7, a network resource identifier for Network Resource 270 persists through the Network Resources accessed by the user. The persistence of this link provides the user with the benefit of having link selectors 294, 298, and 302 available to immediately bring the user back to initial Network Resource 270. In one implementation, link selectors 294, 298, and 302 are buttons in a navigation interface—issuing a URL for Network Resource 270 when selected by the user.

Figure 8:
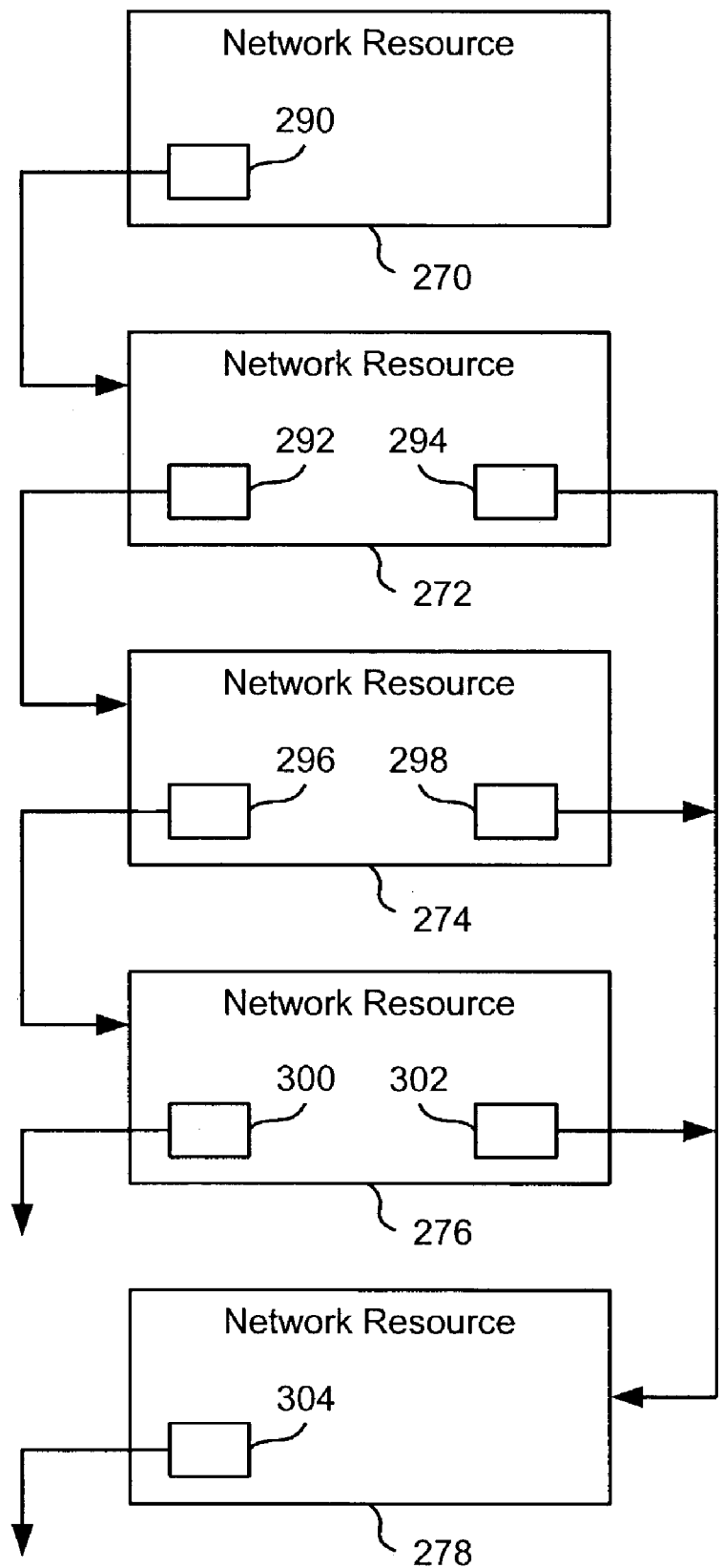
FIG. 8 is a block diagram depicting an alternate embodiment of traversing network resources while persisting a network resource identifier.

FIG. 8 is a block diagram representing a series of network resources accessed by a user in a further embodiment of the present invention. In this embodiment, the similarly numbered objects operate the same as objects with the corresponding numbers in FIG. 7. In the FIG. 8 implementation, link selectors 294, 298, and 302 issue a URL for accessing Network Resource 278 when selected by the user. The difference between the implementations shown in FIG. 8 and FIG. 7 is that the implementation in FIG. 8 allows for persisting a network resource identifier that corresponds to a network resource other than portal 270.

Figure 9:
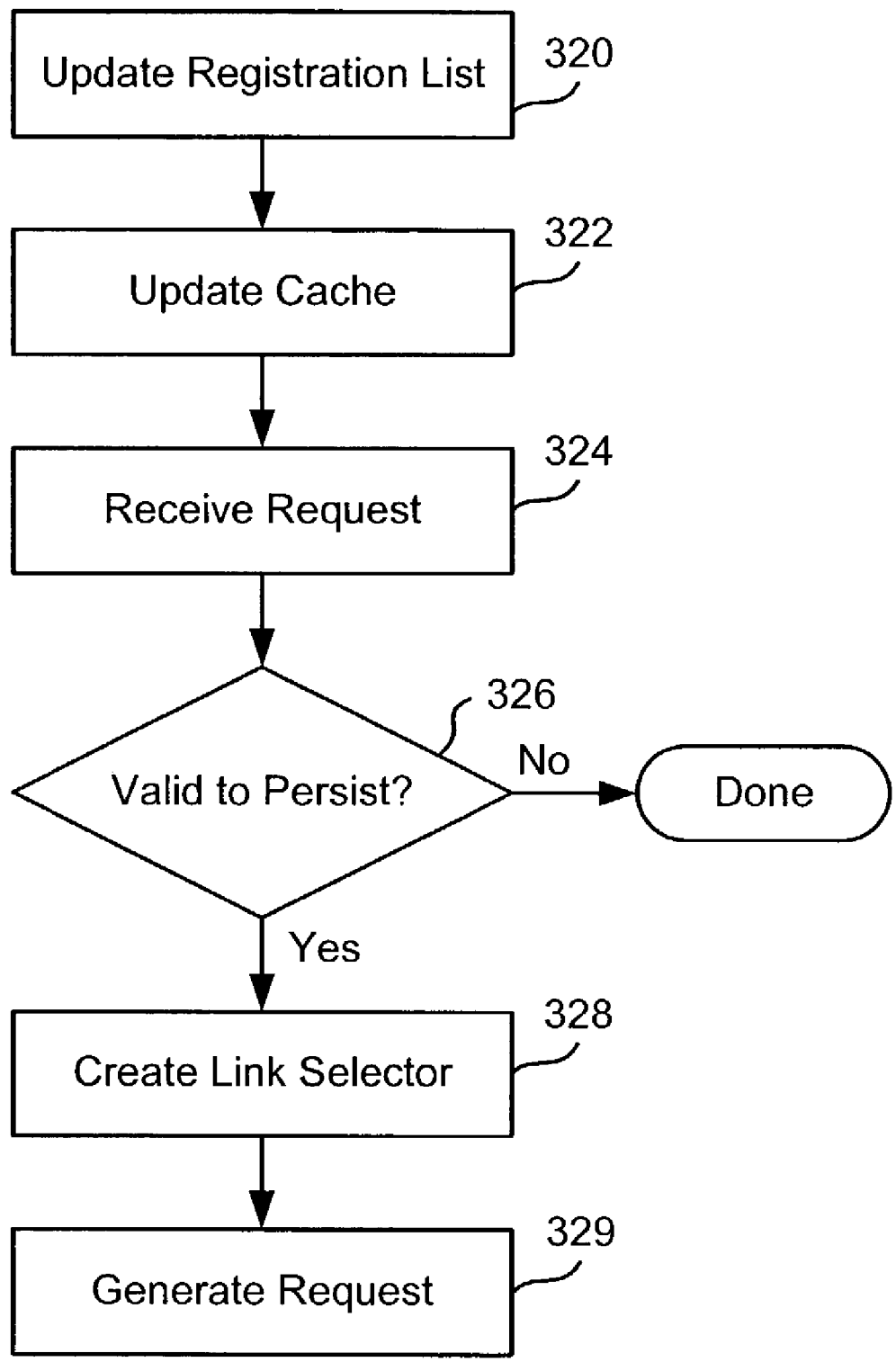
FIG. 9 is a flowchart describing one embodiment of a process for securely persisting a network resource identifier.

FIG. 9 is a flowchart describing one embodiment of a process for supporting the secure persistence of a network resource identifier from one network resource to another. A URL or other network address can serve as a network resource identifier. In further embodiments, any mechanism for identifying a network resource can be a network resource identifier. In one embodiment, the steps shown in FIG. 9 are carried out by an Identity System, an Access System, or integrated Identity/Access System. For purposes of this disclosure, the steps in FIG. 9 will be described with reference to their performance by an Identity System. In further embodiments, however, systems other than an Identity System can carry out the steps shown in FIG. 9. In fact, any system hosting a network resource is suitable for carrying out the steps in FIG. 9 in accordance with embodiments of the present invention.

The Identity System provides for updating a registration list (step 320). The information in the registration list supports the ability to persist network resource identifiers. In one embodiment, a system user updates one or more registration list entries to identify one or more sets of criteria for determining whether a particular network resource identifier is allowed to persist. This security feature is useful to ensure that a user is not fraudulently directed to an imposter portal. More details regarding security are provided below. The Identity System also allows a user to update the registration list with information about creating a link selector that issues a persisted network resource identifier.

In one embodiment, a registration list includes entries with the following fields: 1) Entry Identifier Field—identifying a name for the entry; 2) Network Identifier Field—providing the network resource identifier for a designated network resource; 3) Image Field—identifying an image to be displayed for representing a link selector associated with the network resource identifier in the Network Identifier Field, such as link selectors 294, 298, and 302; and 4) Mouse-Over Message Field—providing a mouse-over message associated with the link selector for the network resource identifier in the Network Identifier Field. Including multiple entries in the registration list allows multiple network resources to be supported as portals.

In a further embodiment, a registration list may contain different information. In one implementation, the registration list contains entries that are the same as described above, except that an Entry Identifier Field is not included. In another embodiment, each entry in the registration list does not include the Image Field or Mouse-Over Message Field. The same image and mouse-over message are employed for each network resource. In a further embodiment, the registration list contains one or more filters that determine whether an identified network resource identifier is allowed to persist. More details about the use of filters are provided below. The registration list can reside in one contiguous location, such as a computer file, or be spread out in distributed locations, such as entries in a database.

After the registration list has been updated, the Identity System updates any caches in the Identity System that maintain information from the registration list. (step 322). The cache update ensures that the Identity System uses the latest registration list information.

The Identity System receives a request (step 324). A request can call for the Identity System to take action, such as performing a function or providing access to an application or other resource. The request identifies a network resource identifier to persist. The request can have various formats to support the inclusion of a parameter that identifies a network resource identifier. In one embodiment, the request is a URL that includes a parameter corresponding to an entry in the registration list. In another embodiment, the request includes a parameter that expressly states the network resource identifier to persist.

After receiving the request, the Identity System determines whether the request corresponds to a network resource identifier that is valid to persist (step 326). In one embodiment, the request is required to include a persistence parameter that corresponds to a network resource identifier that is valid to persist. The persistence parameter must correspond to an entry in the registration list. The Identity System attempts to find an entry in the registration list that corresponds to the value of the request's persistence parameter. The request identifies a valid network resource identifier to persist if the registration list includes an entry with an Entry Identifier that matches the persistence parameter. Otherwise, the Identity System makes an invalid finding (step 326) and the process is done.

In the filter embodiment described above, the Identity System uses a registration file filter to perform step 326. The Identity System determines whether a persistence parameter in the request satisfies a filter in the registration list. For example, the filter may require the persistence parameter to include a network resource identifier with a pattern of one or more characters or some other type of recognition criteria. In still a further embodiment, the request includes the network resource identifier to be persisted. In this embodiment, the Identity System looks at the registration list to determine whether any entries include a matching network resource identifier. Those skilled in the art will recognize that many forms of validation (step 326) can be employed.

If the request's persistence parameter does not correspond to a network resource identifier that is valid to persist, the process in FIG. 9 is done. Otherwise, the Identity System goes on to create a link selector (step 328). The link selector allows a user to access the network resource corresponding to the network resource identifier derived from the request's persistence parameter. Creating the link selector in one embodiment includes retrieval of information stored in the registration list entry that corresponds to the persisted network resource identifier.

In one embodiment, the Identity System identifies a registration list entry with an Entry Identifier Field matching the persistence parameter. The Identity System retrieves the information in the Network Identifier, Image, and Mouse-Over Fields of the entry. The Identity System then uses this information to create the link selector, such as link selectors 294, 298, and 302 in FIGS. 7 and 8. The created link selector has an image that corresponds to the Image Field in the registration list entry and mouse-over text corresponding to the Mouse-Over Text Field in the registration list entry. Upon being selected, the resulting link selector issues the network resource identifier from the registration list entry.

In an embodiment where the request expressly includes the network resource identifier, the Identity System also employs a corresponding registration list entry. In creating the link selector (step 328), the Identity System employs the network resource identifier from the request and the image and mouse-over text from the registration list entry. Greater details will be provided below on how to create a link selector in one embodiment of the present invention. In one such embodiment, a system employs templates and style sheets to create a link selector.

The Identity System also generates outgoing requests with a persistence parameter calling for the persisted network resource identifier to continue to be persisted (step 329). Step 329 is only performed in one embodiment if the persistence is determined to be valid in step 326. In one embodiment, the Identity System employs a persistence parameter with one of the formats described above with reference to earlier steps in the FIG. 9 process.

Looking back at FIG. 7, outgoing requests including a persistence parameter are issued though a link selector, such as link selectors 292, 296, and 300. Alternatively, the outgoing request is issued by a mechanism other than a link selector. For example, an outgoing request may be generated as a result of performing an application. In another implementation, outgoing requests include a cookie that maintains information about a user, including the network resource identifier to persist. In further embodiments, the registration list described above can also include an image and mouse-over text to use in creating a link selector for outgoing requests that persist a network resource identifier.

The process shown in FIG. 9 provides security against abuses of persisting network resource identifiers that defraud system users. In one example, a hacker may provide a web page that mirrors a legitimate organization's portal. The hacker then e-mails a system user a link to the fraudulent portal, and the user proceeds to access a desired application through the portal. Without the security of step 326, the address for the fraudulent portal is persisted from one network resource to another. Eventually, the user selects a link selector and returns to the fraudulent portal. Requiring a persisted network resource identifier to meet a set of filter criteria or correspond to an entry in a registration list prevents a fraudulent portal from being persisted—the network resource identifier for the fraudulent portal will not have a corresponding registration list entry or satisfy filter criteria. The network resource identifier associated with the fraudulent portal will not be valid for persisting (step 326).

The system of FIG. 1 provides users with a variety of interface options. For example, the system supports users with traditional browsers by providing for communication using HTTP and Hypertext Mark-up Language ("HTML"). The system also supports interfaces to third party applications, proprietary browsers and others by providing for communication using Extensible Mark-up Language ("XML"). Embodiments of the present invention provide further flexibility by facilitating the use of custom XML templates to generate HTML and XML responses. This functionality can be employed to create a link selector (step 328, FIG. 9) when persisting a network resource identifier.

Figure 10:
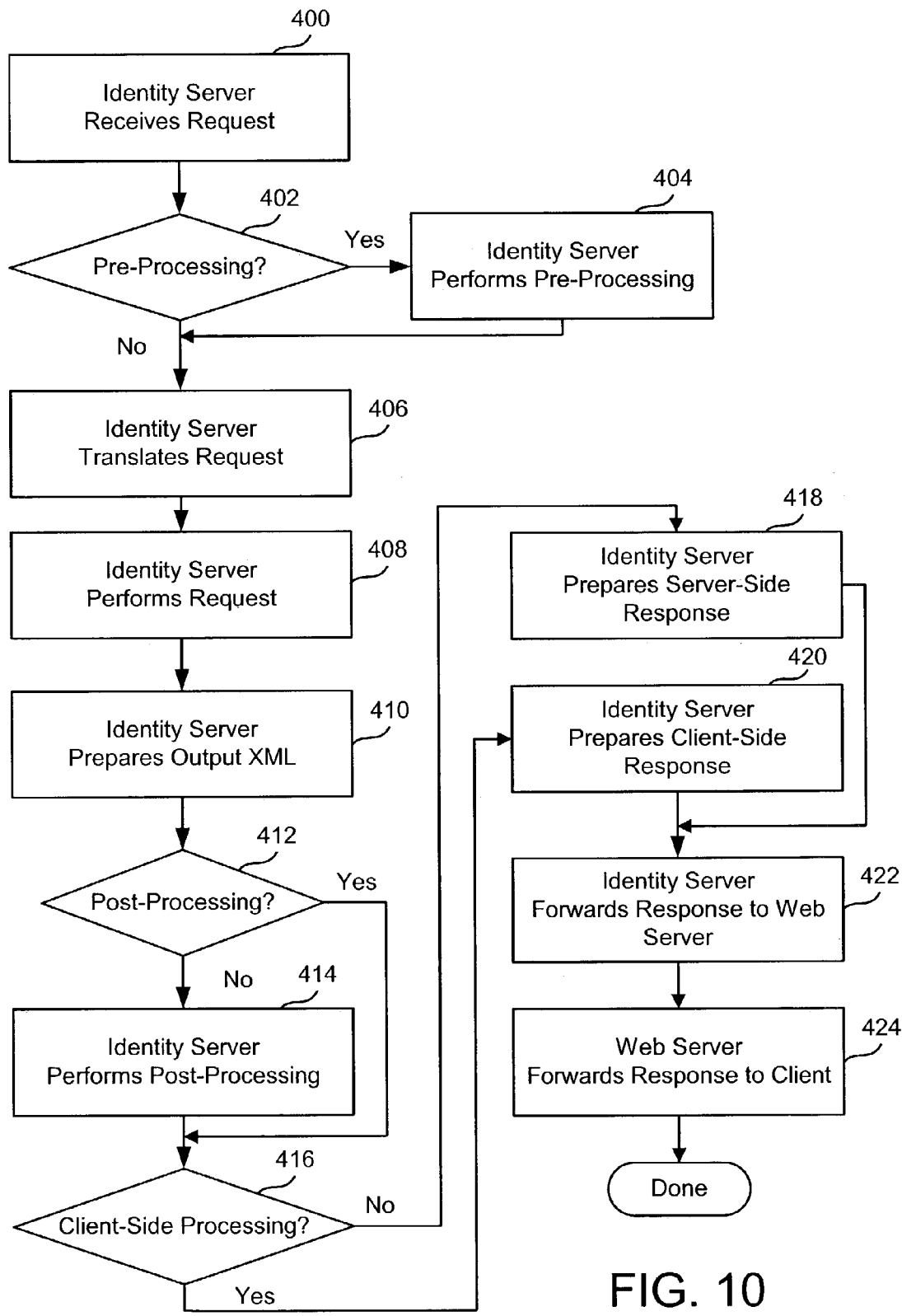
FIG. 10 is a flowchart describing a process for responding to a client's request.

FIG. 10 shows a process employed by Identity Server 40 to provide responses to users' requests, such as requests with parameters for persisting a network resource identifier. Identity Server 40 receives the request from Web Server 20 (step 1600). In one embodiment of the present invention, Identity Server 40 is capable of receiving HTML requests via the HTTP protocol, as well as XML requests via the SOAP protocol (or other protocols). One example of an HTML request over HTTP (or other protocols), appears as follows:

http://host:port/
appname.cgi?param1=value1&param2=val2 . . .

The "http" indicates the request is controlled by the HTTP protocol. The host:port field identifies the host that is the target of the request and port on that host. The appname field identifies the application for Identity Server 40 to perform, such as User Manager 42, Group Manager 44, or Organization Manager 46. The parameter fields (param1, param2, . . . ) identify parameters employed by the identified application.

In one example, param1 identifies a network resource identifier to persist. As described above, param1 can expressly list the network resource identifier or identify an entry in the registration list.

In another example, param1 may be a function the identified application performs, and param2 may be a variable or other information required for carrying out the function. One example of a function is a search program that searches Directory 36 for entries with attributes corresponding to values in the request's parameters. In this example, the parameters may require Identity Server 40 to search Directory 36 for the employee entry for John Smith. When the SOAP protocol is employed, Identity Server 40 receives a request similar to the example described above, with a host:port value that informs Identity Server 40 that the SOAP protocol is in use. The request includes an XML document encapsulated in the SOAP protocol format. Additional details regarding the use of the SOAP protocol are provided in U.S. patent application Ser. No. 09/997,410, entitled "Preparing Output XML Based on Selected Programs and XML Templates," which is incorporated herein by reference.

Once a request is received (step 400, FIG. 10), Identity Server 40 determines whether any pre-processing is required for the request (step 402). Decryption is an example of one pre-processing operation. If pre-processing is required, Identity Server 40 performs the pre-processing operation (step 404). Once pre-processing is complete or if no pre-processing is required, Identity Server 40 translates the request (step 406). In one implementation, Identity Server 40 translates the request by identifying all programs to be performed in response to the request and the format for outputting the results from each program. Process steps for carrying out the translation are described in greater detail below. During translation, Identity Server 40 recognizes that a request parameter is attempting to identify a network resource identifier to persist.

Identity Server 40 performs the request (step 408) after the request is translated. In performing the request, Identity Server 40 retrieves and manipulates data in accordance with the functions identified in the request. During the performance, Identity Server 40 determines whether the network resource identifier to be persisted is valid (step 326, FIG. 9). After the request is performed, Identity Server 40 prepares an Output XML (step 410). The Output XML is a data file organized in accordance with formatting directions retrieved during the translation operation (step 406). In one embodiment of the present invention, the Output XML is formed using a XML template obtained during the translation process (step 406) and display characteristics. The XML template provides a data structure for the Output XML. The use of XML templates and display characteristics is described in greater detail below. The link selector created to persist a network resource identifier (step 328, FIG. 9) is one example of Output XML.

After preparing the Output XML, Identity Server 40 determines whether any post-processing is to be performed (step 412). Post-processing may include operations such as encryption. Embodiments of the present invention also provide for post-processing operations that further customize the Output XML. If post-processing is to be performed, Identity Server 40 carries out the post-processing operation (step 414).

After completing post-processing or if no post-processing is necessary, Identity Server 40 determines whether client-side processing will be used (step 416). In client-side processing, Identity Server 40 provides the Output XML data file to the requesting client through Web Server 20. In contrast, the client may elect to have Identity Server 40 perform server-side processing. In server-side processing, Identity Server 40 processes the Output XML to prepare a response to the request.

If client-side processing is chosen, Identity Server 40 prepares a client-side response (step 420). In one implementation of the present invention, two different client-side responses are possible. The client may receive only the Output XML or both the Output XML and references to a set of XSL stylesheets that contain directives for converting the Output XML into an HTML display. In various embodiments of the present invention, the set of XSL stylesheets may contain one or multiple XSL stylesheets. The user (or client) then formats the Output XML for presentation or any other purpose the user desires. If client-side processing is not selected, Identity Server 40 prepares a server-side response (step 418). In one embodiment, Identity Server 40 combines the Output XML with a XSL stylesheet to obtain a HTML response for the client.

In one embodiment of the present invention, Identity Server 40 determines whether to perform client-side or server-side processing by examining a processing parameter in the request. In a further implementation, the processing parameter also indicates the desired client-side response from Identity Server 40, namely Output XML and XSL stylesheet references or Output XML and no XSL stylesheet references. If the processing parameter is set to equal "xmlnoxsl," Identity Server 40 prepares a client-side processing response including Output XML and no stylesheet references. If the processing parameter is set to equal "xml," Identity Server 40 prepares a client-side processing response including both output XML and references to a set of XSL stylesheets the client can access. If no processing parameter appears in the request, Identity Server 40 defaults to preparing a server-side processing response. In further embodiments, the request can also include a parameter expressly identifying a XSL stylesheet for Identity Server 40 to employ in preparing either a server-side or client-side response.

In another version of the present invention, Identity Server 40 employs a predefined list to determine whether to provide client-side processing or server-side processing. The list identifies browsers that desire client-side processing. If Identity Server 40 receives a request for a browser on the list, Identity Server 40 performs client-side processing. Otherwise, Identity Server 40 performs server-side processing. In a further embodiment, the list distinguishes between client-side processing providing Output XML and XSL stylesheet references and client-side processing providing Output XML and no XSL stylesheet references. The list may be updated by clients.

Once a response has been prepared, Identity Server 40 forwards the response to Web Server 20 (step 422), which forwards the response to the client (step 424).

In order to perform request translation (step 406, FIG. 10), Identity Server 40 maintains program service 460 and XML data registry 470, which are both depicted in FIG. 11. Program service 460 contains a list of the programs supported by applications running on Identity Server 40. Each function in the request corresponds to at least one program listed in program service 460. In one implementation, this includes a function supporting the ability to persist a network resource identifier. Each program listing in program service 460 contains a pointer to a program, as well as any peripheral programs to be performed in conjunction with the listed program. In alternate embodiments of the present invention, the peripheral programs can be identified in the request or a register file in XML data registry 470. An example of a peripheral program is the display of a navigation bar that accompanies the display of a request's results. In one embodiment, the navigation bar includes link selector 294 for persisting a network resource identifier.

XML data registry 470 contains registration files. Each registration file corresponds to at least one program or peripheral programs listed in program service 460. Each registration file contains information necessary for structuring the output of a program's result. Identity Server 40 maintains a set of XML templates 472, XML schemas 474, and XSL stylesheets 476. Each registration file in data registry 470 contains a pointer to an XML template, an XML schema and XSL stylesheet. The application of templates and stylesheets will be explained below in greater detail. Schemas provide information to Identity System users for establishing display characteristics.

FIG. 12 illustrates one embodiment of steps performed by Identity Server 40 to translate a request (step 406, FIG. 10). In step 500, Identity Server 40 identifies programs corresponding to functions called for in the request, including peripheral programs. For each program explicitly identified in the request, Identity Server 40 finds a corresponding entry in program service 460. The corresponding entry contains a pointer to the explicitly identified program, as well as pointers to all peripheral programs to be performed in conjunction with the explicit program. In one embodiment, all explicitly identified programs for workflow related requests include peripheral programs for providing a workflow function navigation bar, a search bar/window, and a standard navigation bar. Other programs include peripheral programs for providing a standard navigation bar and a search window in a window with any displayed program results. In one embodiment, a request parameter for persisting a network resource identifier triggers Identity Server 40 to find an entry in program service 460. In an alternate embodiment, the persistence of a network resource identifier through a link selector is treated as a peripheral program.

Identity Server 40 completes the request translation by retrieving XML templates and XSL stylesheets. Identity Server 40 retrieves a XML template for each identified program and peripheral program (step 402). Identity Server 40 retrieves each template from a register file in data registry 470. Each register file corresponds to at least one combination of an application and a program. Identity Server 40 retrieves a XSL stylesheet for each identified program and peripheral program (step 406). In one embodiment, Identity Server 40 retrieves each stylesheet from the same register files containing the retrieved XML templates.

The following provides an example of a registration file in one embodiment of the present invention:

```
© Oblix, Inc., 2001
<?xml version="1.0"?>
<ObProgramRegistry>
    <ObApplication name="the_application_name">
        <ObProgram name="a_program_name">
            <ObButton name="a_button_name"/>
            <ObButton name="yet_another_button_name"/>
            <ObButton name="and_maybe_more_button_names"/>
            ...
            ...
            <ObTemplate name="templatename.xml"/>
            <ObStyleSheet name="stylesheetname.xsl"/>
            <ObSchema name="XML_schema_name.xsd"/>
        </ObProgram>
        <ObProgram name="another_program_name/">
            <ObStyleSheet name="Its_stylesheetname.xsl"/>
```

```
        <ObButton name="a_button_associated_with_it/">
        <ObSchema name="Its_XML_schema_name.xsd"/>
    </ObProgram>
    <ObProgram name="and_so_on">
        ...
        ...
    </ObProgram>
    ...
    ...
</ObApplication>
</ObProgramRegistry>
```

The ObProgramRegistry directive identifies the file as a registration file. The ObApplication instruction identifies an application. The ObProgram instruction identifies a program. Identity Server 40 uses the ObApplication and ObProgram values to identify the appropriate register file for retrieving a program's XML template, XML schema, and XSL stylesheet. For each program, Identity Server 40 locates the register file with the ObApplication and ObProgram values matching the request's application and program (steps 402 and 406).

Information within an ObProgram directive provides the template, schema and stylesheet for formatting a program's results as Output XML and an HTML document. The ObTemplate field specifies an XML template to be used with the program specified in the ObProgram field. The ObStyleSheet field identifies the XSL stylesheet for the program. The ObSchema field identifies the schema for the program. Identity Server 40 retrieves the identified template and stylesheet in steps 402 and 406 for each program identified in step 400. Execution of the selected program results in the XML template variable being obtained. In one implementation, the template and stylesheet correspond to a link selector for persisting a network resource identifier.

In further embodiments, the register file contains additional information related to preparing an output display for a program's result. For example, one or multiple "ObButton" directives can be associated with a program combination when a button is to be displayed along with program results. The button field is used in preparing the button display for Identity Server 40. For example, it may be appropriate to display an acceptance button along with program results—calling for a user to accept displayed data. A typical button identifies the following characteristics: (1) graphical display; (2) mouse over text; and (3) link that will be invoked when the button is selected by the user. In one implementation, button information is dynamically determined, as opposed to being defined in a template. Another example of a button is link selector 294, in one embodiment.

The use of templates and stylesheets provides users with a great deal of flexibility and control. Templates and stylesheets can be modified to address the unique needs of system users. Different system users employing the same programs can create different displays of the program's results. Users and/or system administrators implement customized templates and stylesheets in desired register files.

FIG. 13 provides a more detailed view of the steps taken by Identity Server 40 to prepare an Output XML for a request using XML templates and attribute display characteristics (step 410, FIG. 10). Identity Server 40 first prepares an XML data structure (step 530). The XML data structure is an organization of data based on the XML templates corresponding to the request's programs. The XML data structure combines the XML templates from each program to form a single data structure. This enables Identity Server 40 to provide a single response to a request instead of a response for each program in the request.

Identity Server 40 maps data retrieved in performing the request's programs into the XML data structure. When a link selector is created (step 328, FIG. 9) for persisting a network resource identifier, a corresponding XML data structure is loaded with data for the link selector. In one implementation, this data includes the network resource identifier, image, and mouse-over text from the registration list entry.

In some instances, an XML template defines data to be retrieved—calling for data from an attribute based on the status of another attribute. Template elements calling for indirect proxies are also mapped into the XML data structure. Prior to mapping these elements into the XML data structure, Identity Server 40 prepares a data structure identifying each of the entries used to obtain the indirect proxy values. Identity Server 40 then adds data for the indirect proxy values to the XML data structure, which can contain both direct and indirect proxies.

After preparing the XML data structure (step 530, FIG. 39), Identity Server 40 transforms the XML data structure into Output XML (step 532). Identity Server 40 obtains attribute display characteristics for the retrieved attributes in the XML data structure. The display characteristics establish the display format of attribute data in the XML data structure. Attribute display characteristics identify a display type and relevant information for the display. For example, a text box display type and the length of the text box.

In one embodiment, Identity Server 40 obtains attribute display characteristics from directory entries in Directory 36. Each directory entry corresponds to a different attribute type. For each attribute, Identity Server 40 locates a corresponding directory entry, which provides the attribute's display characteristics. In one such embodiment, a system administrator creates all the display attribute directory entries when Identity System 40 is configured. In alternate embodiments of the present invention, the directory entries are replaced by tables, data structures, or other means that relate display characteristics to attributes so the display characteristics can be obtained by Identity Server 40.

As explained above, the Output XML is combined with XSL stylesheets to obtain HTML displays. XSL stylesheets interpret directives integrated into the Output XML by the attribute display characteristics—providing instructions to Identity Server 40 or any other processing engine to implement the formatting called for by the attribute display characteristics. For example, the attribute display characteristics may have integrated directives into the Output XML indicating that an attribute is to be displayed according to a particular type. The identified type corresponds to a set of instructions in an XSL stylesheet that direct a processor to display the value with a particular font and size. In one example, the display type instructions in the XSL stylesheet indicate that the attribute value is to be displayed in an Arial font with 12 point typeface.

Figure 14:
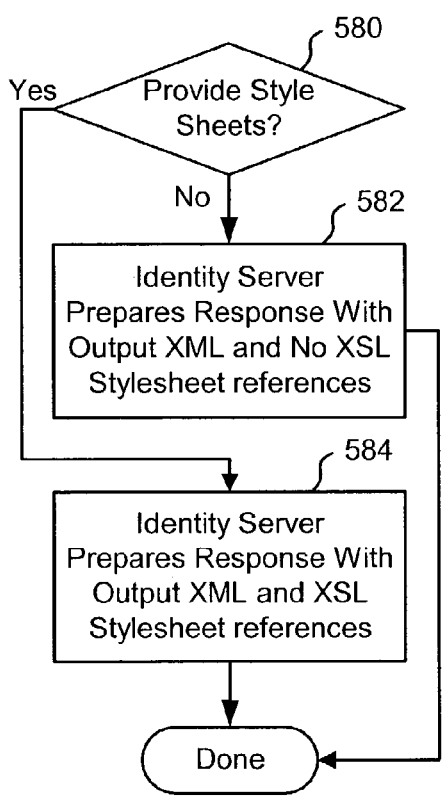
FIG. 14 is a flowchart describing a process for preparing a client-side response.

FIG. 14 describes the operations performed by Identity Server 40 to prepare a client-side response (step 420, FIG. 10). Identity Server 40 determines whether the client wishes to receive references to a set of XSL stylesheets (step 580). If the client wishes to receive XSL stylesheet references, Identity Server 40 prepares a response including Output XML and the associated XSL stylesheet references (step 584). Otherwise, Identity Server 40 prepares a response with Output XML and no XSL stylesheet references (582). Client-side processing is useful in several applications. In one instance, a client may wish to receive only Output XML for a third party application that does not require any display. This makes the display rules and information in the stylesheets useless. In another instance, a client's browser may do a superior job of combining Output XML and XSL stylesheets to form an output display. In this instance, client-side processing allows the client to use their own browser to combine Output XML and XSL stylesheets. In one embodiment, XSL stylesheet references are provided in the form of Uniform Resource Identifiers (also known as Uniform Resource Locators) in the Output XML.

Figure 15:
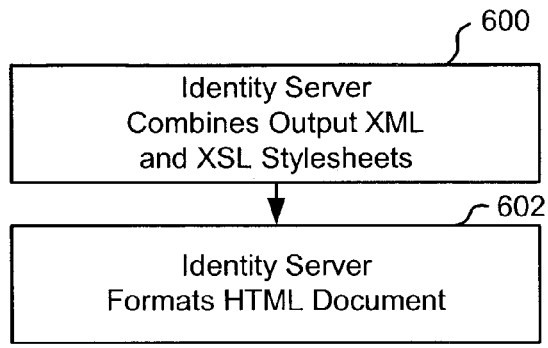
FIG. 15 is a flowchart describing a process for preparing a server-side response.

FIG. 15 shows the operation of Identity Server 40 in preparing a server-side response (step 428, FIG. 10). Identity Server 40 combines the Output XML with its associated XSL stylesheets (step 600). Identity Server 40 then formats the resulting combination as an HTML output document (step 602).

One of the peripheral programs frequently performed in conjunction with a user's expressly requested program is the generation of a navigation bar. The navigation bar is displayed along with the result of a user's expressly identified program—enabling the user to navigate within the request response and other related areas. For example, the navigation bar lets a user scroll through the text of the response and jump to related data in Directory 36. Some implementations of Identity Server 40, however, provide users with different levels of access to Directory 36 and functions performed by Identity Server 40. Identity Server 40 provides for displaying different navigation bars based on user access privileges. In one embodiment, a link selector for use in persisting a network resource identifier is included in the navigation bar.

Figure 16:
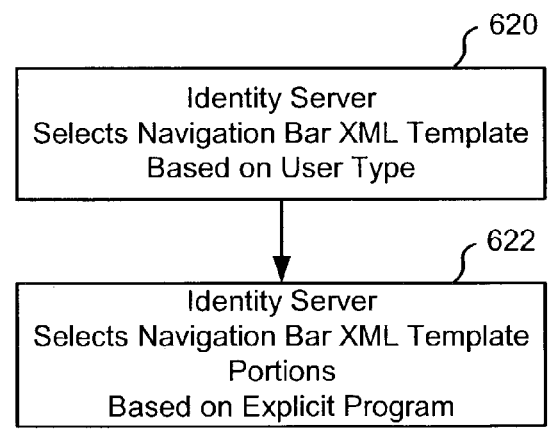
FIG. 16 is a flowchart describing a process for identifying an XML template for a navigation bar.

FIG. 16 shows steps performed by Identity Server 40 that provide different navigation bars based on a user's access privileges. As explained above, Identity Server 40 retrieves a navigation bar peripheral program from program service 460 as part of the translation process (step 406, FIG. 10 and step 500, FIG. 12). Identity Server 40 also retrieves an XML template and XSL stylesheet for the navigation bar program (steps 502 and 506, FIG. 12). In one embodiment of the present invention, Identity Server 40 maintains a set of navigation bar templates for a program, as opposed to a single navigation bar template. Each navigation bar template corresponds to a different user type where each user type has different access privileges. In retrieving an XML template for the navigation bar, Identity Server 40 carries out the steps shown in FIG. 16. Identity Server 40 selects the navigation bar XML template corresponding to the user issuing the request (step 620). Identity Server 40 then selects portions of the navigation bar template that are relevant to the user's explicitly requested program (step 621). In some instances, portions of the selected navigation bar template may not be relevant to the request response. The selected portions of the navigation bar template form the XML template for the navigation bar program. Identity Server 40 employs the resulting XML template to prepare a response in the manner described above.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of persisting a network resource identifier, comprising the steps of:
   receiving a request for a first network resource, said request corresponding to a first network resource identifier, said request identifying a second network resource identifier to be persisted, said second network resource identifier addressing an initial network resource;
   determining whether said second network resource identifier is valid to persist based on a registration list identifying criteria for determining whether said second network resource identifier is not fraudulent;
   creating a link selector including an image and mouse-over text, based on a determination that said second network resource identifier is valid to persist, said link selector issues said second network identifier when selected by a user, wherein creating said link selector further includes obtaining said image and said mouse-over text using an entry which corresponds to said second network resource identifier in the registration list; and
   providing a network addressable page in response to said request, wherein said network addressable page comprises said link selector, wherein, when said link selector is selected by a user, said link selector navigates to said initial network resource.

2. The method according to claim 1, wherein said request includes a parameter corresponding to said second network resource identifier.

3. The method according to claim 2, wherein determining whether said second network resource identifier is valid to persist comprises:
   identifying an entry in the registration list that corresponds to said parameter.

4. The method according to claim 3, wherein said entry includes an Entry Identifier Field that matches said parameter.

5. The method according to claim 3, wherein said entry includes a Network Identifier Field that matches said network resource identifier.

6. The method according to claim 3, wherein said entry identifies an image and mouse-over test.

7. The method according to claim 1, wherein determining whether said second network resource identifier is valid to persist comprises:
   determining whether said second network resource identifier satisfies a filter contained in the registration list.

8. The method according to claim 7, wherein said filter specifies a character pattern.

9. The method according to claim 1, wherein said second network resource identifier is a Uniform Resource Locator.

10. The method according to claim 1, wherein said method further comprises:
    generating a second request, wherein said second request includes a parameter corresponding to said second network resource identifier.

11. The method according to claim 10, wherein said parameter in said second request calls for said second network resource identifier to be persisted by a network resource addressed by said second request.

12. The method according to claim 11, wherein said network resource addressed by said second request creates a second link selector for issuing said second network resource identifier.

13. The method according to claim 1, wherein said initial network resource is associated with an Identity System.

14. The method according to claim 13, wherein said initial network resource is a portal.

15. The method according to claim 1, wherein said initial network resource is associated with an Access System.

16. The method according to claim 1, wherein said method is performed by an Identity System.

17. The method according to claim 1, wherein said method is performed by an Access System.

18. The method according to claim 1, wherein said method is performed by an integrated Identity and Access System.

19. One or more processor readable storage devices having processor readable code embodied on said one or more processor readable storage devices, said processor readable code for programming one or more processors, said processor readable code comprising:
  code for receiving a request for a first network resource, said request corresponding to a first network resource identifier, said request identifying a second network resource identifier to be persisted, said second network resource identifier addressing an initial network resource;
  code for determining whether said second network resource identifier is valid to persist based on a registration list identifying criteria for determining whether said second network resource identifier is not fraudulent;
  code for creating a link selector including an image and mouse-over text, based on a determination that said second network resource identifier is valid to persist, said link selector issues said second network identifier when selected by a user, wherein creating said link selector further includes obtaining said image and said mouse-over text using an entry which corresponds to said second network resource identifier in the registration list; and
  code for providing a network addressable page in response to said request, wherein said network addressable page comprises said link selector, wherein, when said link selector is selected by a user, said link selector navigates to said initial network resource.

20. The one or more processor readable storage devices according to claim 19, wherein said request includes a parameter corresponding to said second network resource identifier.

21. The one or more processor readable storage devices according to claim 20, wherein said code for determining whether said second network resource identifier is valid to persist comprises:
  code for identifying an entry in the registration list that corresponds to said parameter.

22. The one or more processor readable storage devices according to claim 19, wherein said code for determining whether said second network resource identifier is valid to persist comprises:
  code for determining whether said second network resource identifier satisfies a filter contained in the registration list.

23. The one or more processor readable storage devices according to claim 19, wherein said link selector includes an image, and wherein said code for creating a link selector comprises:
  code for obtaining said image using an entry in the registration list, wherein said entry corresponds to said second network resource identifier.

24. The one or more processor readable storage devices according to claim 19, wherein said second network resource identifier is a Uniform Resource Locator.

25. The one or more processor readable storage devices according to claim 19, wherein said processor readable code further comprises:
  code for generating a second request wherein said second request includes a parameter corresponding to said second network resource identifier.

26. The one or more processor readable storage devices according to claim 25, wherein said parameter in said second request calls for said second network resource identifier to be persisted by a network resource addressed by said second request.

27. The one or more processor readable storage devices according to claim 19, wherein said initial network resource is associated with an Identity System.

28. The one or more processor readable storage devices according to claim 27, wherein said initial network resource is a portal.

29. The one or more processor readable storage devices according to claim 19, wherein said processor readable code is executable by an Identity System.

30. The one or more processor readable storage devices according to claim 19, wherein said processor readable code is executable by an Access System.

31. An apparatus, comprising:
  one or more storage devices; and
  one or more processors in communication with said one or more storage devices, said one or more storage devices having processor readable code embodied thereon, said processor readable code for programming said one or more processors, said processor readable code comprising:
  code for receiving a request for a first network resource, said request corresponding to a first network resource identifier, said request identifying a second network resource identifier to be persisted, said second network resource identifier addressing an initial network resource;
  code for determining whether said second network resource identifier is valid to persist based on a registration list identifying criteria for determining whether said second network resource identifier is not fraudulent;
  code for creating a link selector including an image and mouse-over text, based on a determination that said second network resource identifier is valid to persist, said link selector issues said second network identifier when selected by a user, wherein creating said link selector further includes obtaining said image and said mouse-over text using an entry which corresponds to said second network resource identifier in the registration list; and
  code for providing a network addressable page in response to said request, wherein said network addressable page comprises said link selector, wherein, when said link selector is selected by a user, said link selector navigates to said initial network resource.

32. The apparatus according to claim 31, wherein said request includes a parameter corresponding to said second network resource identifier and said code for determining whether said second network resource identifier is valid to persist comprises:
  code for identifying an entry in the registration list that corresponds to said parameter.

33. The apparatus according to claim 31, wherein said code for determining whether said second network resource identifier is valid to persist comprises:
  code for determining whether said second network resource identifier satisfies a filter contained in the registration list.

34. The apparatus according to claim 31, wherein said processor readable code further comprises:

code for generating a second request, wherein said second request includes a parameter corresponding to said second network resource identifier and said parameter in said second request calls for said second network resource identifier to be persisted by a network resource addressed by said second request.

35. The apparatus according to claim 34, wherein said network resource addressed by said second request creates a link selector for issuing said second network resource identifier.

36. The apparatus according to claim 31, wherein said apparatus comprises an Identity System.

37. The apparatus according to claim 31, wherein said apparatus comprises an Access System.

38. A method of persisting a network resource identifier, the method comprising:

receiving a request with a parameter corresponding to a network resource identifier to persist, wherein said network resource identifier addresses a first network resource, and wherein the first network resource is not a network resource that issued said request;

determining that said network resource identifier is valid to persist, based on said parameter and a registration list identifying criteria for determining whether said second network resource identifier is not fraudulent;

creating a link selector including an image and mouse-over text, based on a determination that said network resource identifier is valid to persist, said link selector for issuing said network resource identifier when selected by a user, wherein creating said link selector further includes obtaining said image and said mouse-over text using an entry which corresponds to said network resource identifier in the registration list; and providing a webpage in response to said request, wherein said webpage comprises said link selector, wherein, when said link selector is selected by a user, said link selector navigates to said first network resource.

39. The method according to claim 38, wherein said method further comprises:

generating a second request, wherein said second request includes a parameter corresponding to said network resource identifier to persist.

40. The method according to claim 39, wherein said parameter in said second request calls for said network resource identifier to be persisted by a network resource addressed by said second request.

41. The method according to claim 40, wherein said network resource addressed by said second request creates a link selector for issuing said network resource identifier.

42. The method according to claim 38, wherein said link selector includes an image.

43. The method according to claim 42, wherein creating a link selector comprises:

obtaining said image using an entry in the registration list, wherein said entry corresponds to said network resource identifier.

44. The method according to claim 43, wherein said link selector includes mouse-over text.

45. The method according to claim 44, wherein creating a link selector comprises:

obtaining said mouse-over text using said entry in said registration list.

46. The method according to claim 38, wherein said network resource identifier is a Uniform Resource Locator.

47. The method according to claim 38, wherein said network resource identifier addresses a network resource associated with an Identity System.

48. The method according to claim 47, wherein said network resource is a web page for an application in said Identity System.

49. The method according to claim 38, wherein said network resource identifier addresses a network resource associated with an Access System.

50. The method according to claim 38, wherein said method is performed by an Identity System.

51. The method according to claim 38, wherein said method is performed by an Access System.

52. The method according to claim 38, wherein said method is performed by an integrated Identity and Access System.

53. One or more processor readable storage devices having processor readable code embodied on said one or more processor readable storage devices, said processor readable code for programming one or more processors, said processor readable code comprising:

code for receiving a request with a parameter corresponding to a network resource identifier to persist, wherein said network resource identifier addresses a first network resource, and wherein the first network resource is not a network resource that issued said request;

code for determining that said network resource identifier is valid to persist, based on said parameter and a registration list identifying criteria for determining whether said second network resource identifier is not fraudulent;

code for creating a link selector including an image and mouse-over text, based on a determination that said network resource identifier is valid to persist, said link selector for issuing said network resource identifier when selected by a user, wherein creating said link selector further includes obtaining said image and said mouse-over text using an entry which corresponds to said network resource identifier in the registration list; and code for providing a webpage in response to said request, wherein said webpage comprises said link selector, wherein, when said link selector is selected by a user, said link selector navigates to said first network resource.

54. The one or more processor readable storage devices according to claim 53, wherein said processor readable code further comprises:

code for generating a second request, wherein said second request includes a parameter corresponding to said network resource identifier to persist.

55. The one or more processor readable storage devices according to claim 54, wherein said parameter in said second request calls for said network resource identifier to be persisted by a network resource addressed by said second request.

56. The one or more processor readable storage devices according to claim 53, wherein said link selector includes an image, and wherein said code for creating a link selector comprises:

code for obtaining said image using an entry in the registration list, wherein said entry corresponds to said network resource identifier.

57. The one or more processor readable storage devices according to claim 56, wherein said link selector includes mouse-over text, and wherein said code for creating a link selector comprises:

code for obtaining said mouse-over text using said entry in said registration list.

58. The one or more processor readable storage devices according to claim 53, wherein said processor readable code is executable by an Identity System.

59. The one or more processor readable storage devices according to claim 53, wherein said processor readable code is executable by an Access System.

60. An apparatus, comprising:
one or more storage devices; and
one or more processors in communication with said one or more storage devices, said one or more storage devices having processor readable code embodied thereon, said processor readable code for programming said one or more processors, said processor readable code comprising:
code for receiving a request with a parameter corresponding to a network resource identifier to persist, wherein said network resource identifier addresses a first network resource, and wherein the first network resource is not a network resource that issued said request;
code for determining that said network resource identifier is valid to persist, based on said parameter and a registration list identifying criteria for determining whether said second network resource identifier is not fraudulent;
code for creating a link selector including an image and mouse-over text, based on a determination that said network resource identifier is valid to persist, said link selector for issuing said network resource identifier when selected by a user, wherein creating said link selector further includes obtaining said image and said mouse-over text using an entry which corresponds to said network resource identifier in the registration list; and
code for providing a webpage in response to said request, wherein said webpage comprises said link selector, wherein, when said link selector is selected by a user, said link selector navigates to said first network resource.

61. The apparatus according to claim 60, wherein said processor readable code further comprises:
code for generating a second request, wherein said second request includes a parameter corresponding to said network resource identifier to persist, wherein said parameter in said second request calls for said network resource identifier to be persisted by a network resource addressed by said second request.

62. The apparatus according to claim 60, wherein said link selector includes an image and mouse-over text, and wherein said code for creating a link selector comprises:
code for obtaining said image using an entry in the registration list, wherein said entry corresponds to said network resource identifier; and
code for obtaining said mouse-over text using said entry in said registration list.

63. The apparatus according to claim 60, wherein said apparatus comprises an Identity System.

64. The apparatus according to claim 60, wherein said apparatus comprises an Access System.

65. A method of persisting a network resource identifier, the method comprising:
receiving a request with a parameter corresponding to a network resource identifier to persist, said network resource identifier addresses a first network resource;
determining whether said network resource identifier is valid to persist based on a registration list identifying criteria for determining whether the second network resource identifier is not fraudulent;
generating a second request, wherein said second request includes a parameter corresponding to said network resource identifier to persist, and wherein said parameter calls for said network identifier to be persisted by a second network resource addressed by said second request;
creating, at said second network resource addressed by said second request, a link selector including an image and mouse-over text for issuing said network resource identifier, wherein creating said link selector further includes obtaining said image and said mouse-over text using an entry which corresponds to said second network resource identifier in the registration list; and
providing a network addressable page in response to said second request, wherein said network addressable page comprises said link selector, wherein, when said link selector is selected by a user, said link selector navigates to said first network resource.

66. The method according to claim 65, wherein said method is performed by an Identity System.

67. The method according to claim 65, wherein said method is performed by an Access System.

68. One or more processor readable storage devices having processor readable code embodied on said one or more processor readable storage devices, said processor readable code for programming one or more processors, said processor readable code comprising:
code for receiving a request with a parameter corresponding to a network resource identifier to persist, said network resource identifier addresses a first network resource;
code for determining whether said network resource identifier is valid to persist based on a registration list identifying criteria for determining whether the second network resource identifier is not fraudulent;
code for generating a second request, wherein said second request includes a parameter corresponding to said network resource identifier to persist, and wherein said parameter calls for said network identifier to be persisted by a second network resource addressed by said second request;
code for creating, at said second network resource addressed by said second request, a link selector including an image and mouse-over text for issuing said network resource identifier, wherein creating said link selector further includes obtaining said image and said mouse-over text using an entry which corresponds to said second network resource identifier in the registration list; and
code for providing a network addressable page in response to said second request, wherein said network addressable page comprises said link selector, wherein, when said link selector is selected by a user, said link selector navigates to said first network resource.

69. The one or more processor readable storage devices according to claim 68, wherein said processor readable code is executable by an Identity System.

70. An apparatus, comprising:
one or more storage devices; and
one or more processors in communication with said one or more storage devices, said one or more storage devices having processor readable code embodied thereon, said processor readable code for programming said one or more processors, said processor readable code comprising:

code for receiving a request with a parameter corresponding to a network resource identifier to persist, said network resource identifier addresses a first network resource;

code for determining whether said network resource identifier is valid to persist based on a registration list identifying criteria for determining whether the second network resource identifier is not fraudulent;

code for generating a second request, wherein said second request includes a parameter corresponding to said network resource identifier to persist, and wherein said parameter calls for said network identifier to be persisted by a second network resource addressed by said second request;

code for creating, at said second network resource addressed by said second request, a link selector including an image and mouse-over text for issuing said network resource identifier, wherein creating said link selector further includes obtaining said image and said mouse-over text using an entry which corresponds to said second network resource identifier in the registration list; and code for providing a network addressable page in response to said second request, wherein said network addressable page comprises said link selector, wherein, when said link selector is selected by a user, said link selector navigates to said first network resource.

71. The method recited by claim 1, further comprising displaying the network addressable page, including the link selector, for said user.

72. The method recited by claim 71, further comprising:
receiving from said user a selection of the link selector; and
returning said user to said initial network resource.

73. The method of claim 1, wherein the network addressable page comprises a webpage.

74. The one or more processor readable storage devices of claim 19, wherein the network addressable page comprises a webpage.

75. The apparatus of claim 31, wherein the network addressable page comprises a webpage.

* * * * *

UNITED STATES PATENT AND TRADEMARK OFFICE
CERTIFICATE OF CORRECTION

PATENT NO. : 7,428,592 B2 Page 1 of 1
APPLICATION NO. : 10/345879
DATED : September 23, 2008
INVENTOR(S) : Lee et al.

It is certified that error appears in the above-identified patent and that said Letters Patent is hereby corrected as shown below:

On face page, in field 74, in column 2, under "Attorney, Agent, or Firm", line 1, delete "Tonwsned" and insert -- Townsend --, therefor.

On page 3, in column 1, under "Other Publications", line 3, delete ""APis" and insert -- "APIs --, therefor.

Signed and Sealed this

Sixteenth Day of March, 2010

David J. Kappos
*Director of the United States Patent and Trademark Office*